US007180702B2

(12) United States Patent
Ellis et al.

(10) Patent No.: US 7,180,702 B2
(45) Date of Patent: Feb. 20, 2007

(54) DATA CARTRIDGES HANDLER INCLUDING A RING-SHAPED CAROUSEL AND A PICKER WITHIN THE INNER PERIPHERY OF THE CAROUSEL

(75) Inventors: John Ellis, Louisville, CO (US); John A. Barkley, Longmont, CO (US); John D. Miller, Arvada, CO (US)

(73) Assignee: Tandberg Data Cop., Boulder, CO (US)

( * ) Notice: Subject to any disclaimer, the term of this patent is extended or adjusted under 35 U.S.C. 154(b) by 415 days.

(21) Appl. No.: 10/795,449

(22) Filed: Mar. 9, 2004

(65) Prior Publication Data

US 2005/0201006 A1 Sep. 15, 2005

(51) Int. Cl.
*G11B 15/675* (2006.01)

(52) U.S. Cl. .................. 360/92; 360/98.06; 369/30.44; 369/30.5

(58) Field of Classification Search .................. 360/92, 360/98.06, 30.5; 369/30.44, 30.5
See application file for complete search history.

(56) References Cited

U.S. PATENT DOCUMENTS

| 4,779,151 A * | 10/1988 | Lind et al. ..................... 360/92 |
| 4,972,277 A | 11/1990 | Sills et al. |
| 4,984,106 A | 1/1991 | Herger et al. |
| 5,059,772 A | 10/1991 | Younglove |
| 5,103,986 A | 4/1992 | Marlowe |
| 5,237,467 A | 8/1993 | Marlowe |
| 5,369,385 A | 11/1994 | Schulte et al. |
| 5,416,653 A | 5/1995 | Marlowe |
| 5,449,091 A * | 9/1995 | Dalziel .......................... 221/81 |
| 5,454,485 A * | 10/1995 | Dalziel .......................... 221/83 |
| 5,487,579 A | 1/1996 | Woodruff et al. |
| 5,498,116 A | 3/1996 | Woodruff et al. |

(Continued)

*Primary Examiner*—Jefferson Evans
(74) *Attorney, Agent, or Firm*—Nixon & Vanderhye, P.C.

(57) ABSTRACT

A data cartridge handling apparatus comprises a ring-shaped carousel (40) rotatably mounted within a housing (22). Cartridge-accommodating cells (52) are angularly arranged about the carousel between an inner periphery (48) and an outer periphery (50) of the carousel. A transducing drive (70) is mounted within the housing and outside the outer periphery. A motor (60) rotates the carousel to facilitate selective alignment of a selected cell (52S) with the drive (70) along a radial dimension (106) of the carousel. A picker (100, 200) is mounted within the housing at a point within the inner periphery of the carousel (40). The picker (100, 200) has a picker arm (104, 204). A distal end of the picker arm has a gripper (110, 210) which selectively engages and disengages a data cartridge (72). The picker arm linearly translates in the radial dimension for the purpose of moving an engaged data cartridge from the selected cell (52S) to a loading position of the drive (70), and conversely for unloading a data cartridge from the drive and withdrawing the same into the selected cell. The gripper comprises a thumb (112, 230). One of the gripper and the thumb is pivotally connected to the picker arm to allow the thumb to selective engage and disengage a feature (160) on the data cartridge. A trip member (150, 250) is mounted in the housing between the outer periphery of the carousel and the drive for actuating pivoting of the gripper, and thereby actuating the selective disengagement of the picker thumb with the feature on the data cartridge for loading of the data cartridge into the drive.

23 Claims, 31 Drawing Sheets

U.S. PATENT DOCUMENTS

| | | | |
|---|---|---|---|
| 5,511,871 A | * | 4/1996 | Dalziel .................... 312/9.46 |
| 5,541,896 A | * | 7/1996 | Ashby .................... 369/30.77 |
| 5,682,276 A | * | 10/1997 | Hinnen et al. ................ 360/92 |
| 5,718,339 A | | 2/1998 | Woodruff et al. |
| 5,739,978 A | | 4/1998 | Ellis et al. |
| 5,867,344 A | * | 2/1999 | Ellis et al. .................... 360/92 |
| 5,872,997 A | | 2/1999 | Golson |
| 5,892,633 A | | 4/1999 | Ayres et al. |
| 5,920,709 A | | 7/1999 | Hartung et al. |
| 5,959,800 A | | 9/1999 | Hartung et al. |
| 5,995,306 A | | 11/1999 | Contreras et al. |
| 6,005,745 A | | 12/1999 | Filkins et al. |
| 6,008,964 A | | 12/1999 | Goodknight et al. |
| 6,031,671 A | | 2/2000 | Ayres |
| 6,144,521 A | | 11/2000 | Egan et al. |
| 6,175,467 B1 | | 1/2001 | Schneider et al. |
| 6,229,666 B1 | | 5/2001 | Schneider et al. |
| 6,229,667 B1 | * | 5/2001 | Ostwald .................... 360/92 |
| 6,233,111 B1 | | 5/2001 | Schneider et al. |
| 6,236,530 B1 | | 5/2001 | Schneider et al. |
| 6,239,941 B1 | | 5/2001 | Small |
| D456,404 S | | 4/2002 | Small et al. |
| 6,385,003 B1 | | 5/2002 | Ellis |
| D464,354 S | | 10/2002 | Small |
| 6,462,900 B1 | | 10/2002 | Egan et al. |
| 6,466,396 B1 | | 10/2002 | Egan et al. |

* cited by examiner

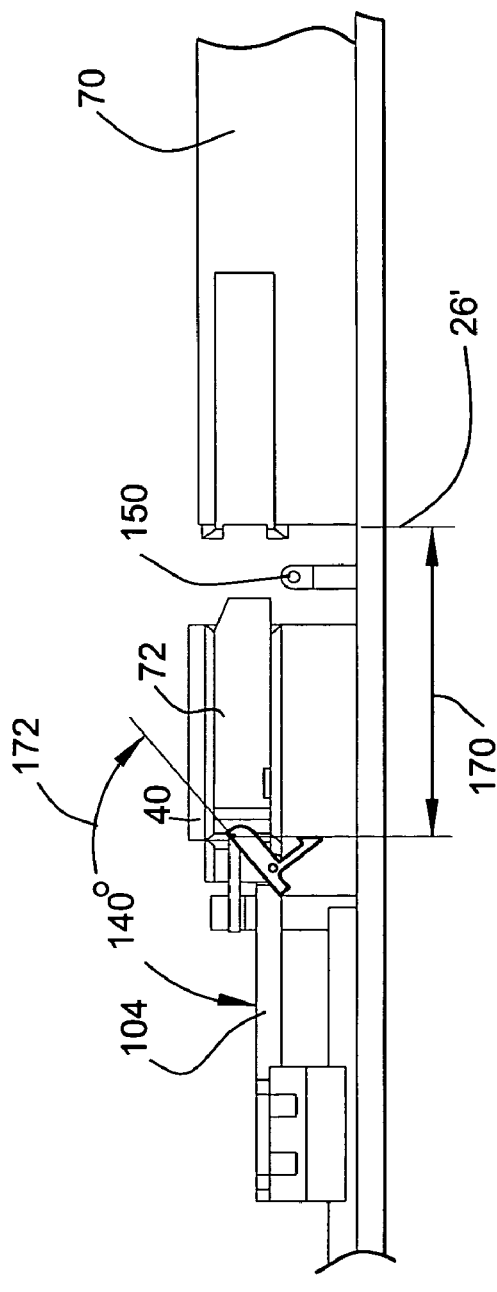
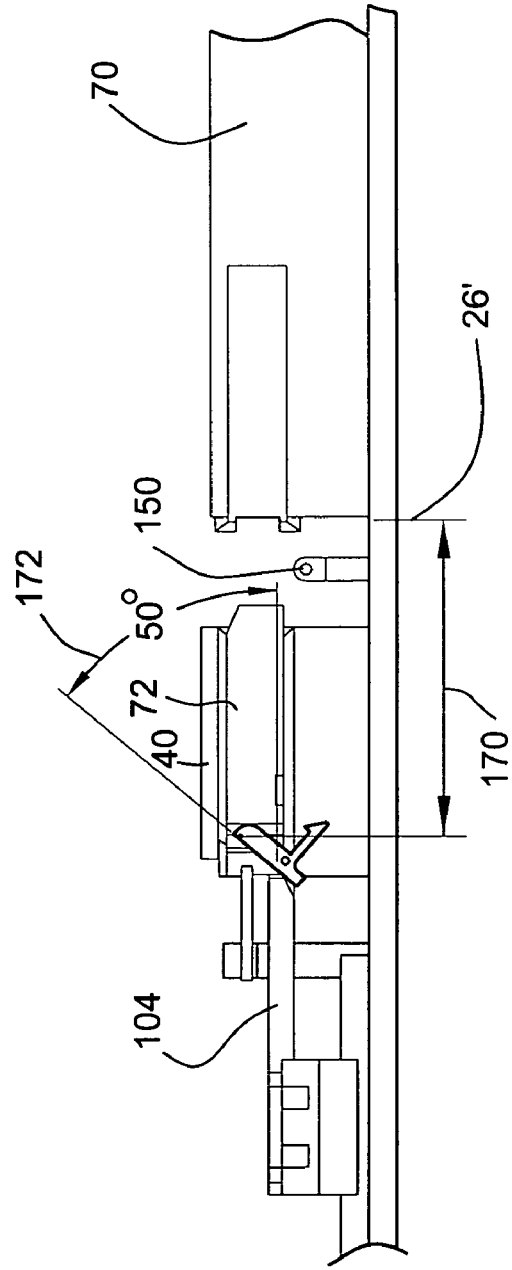

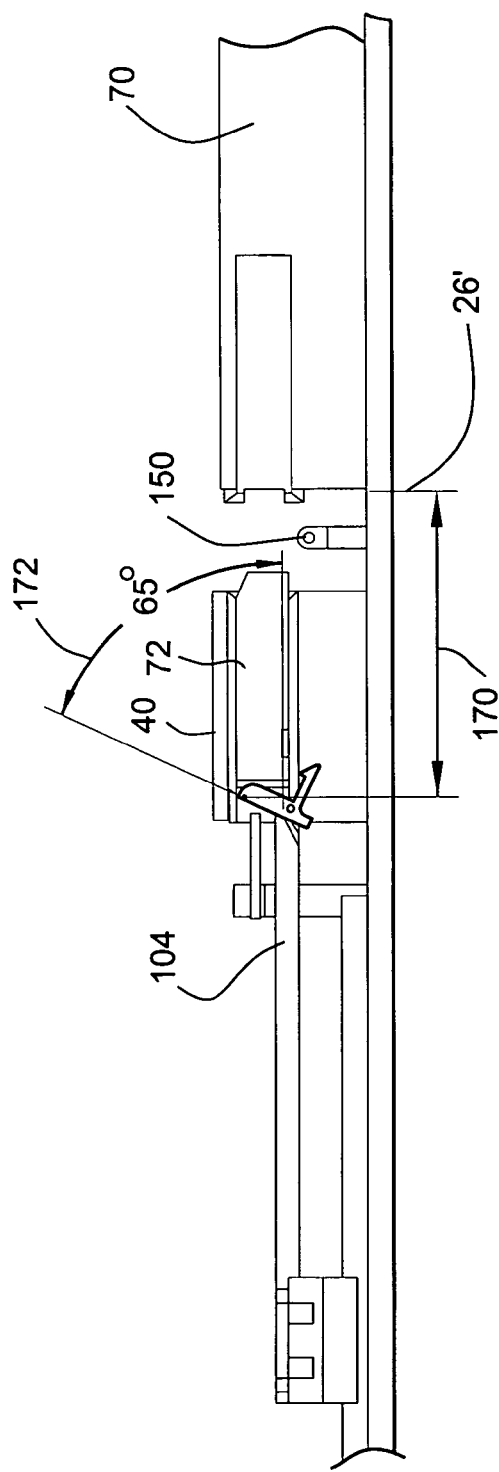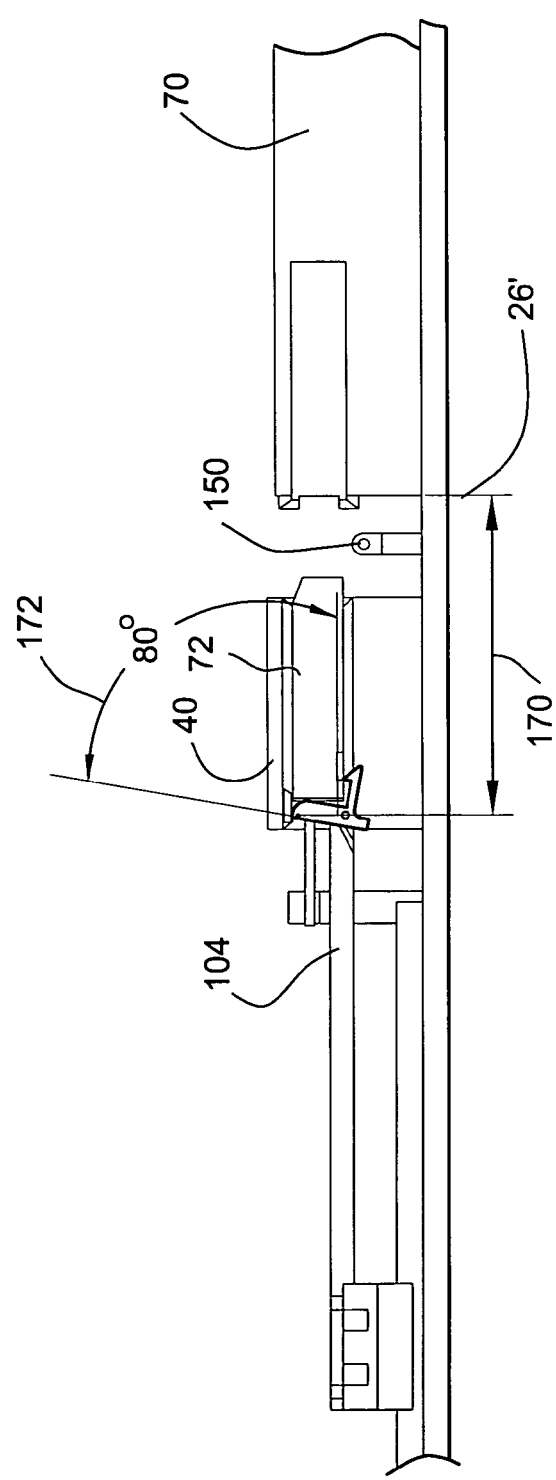

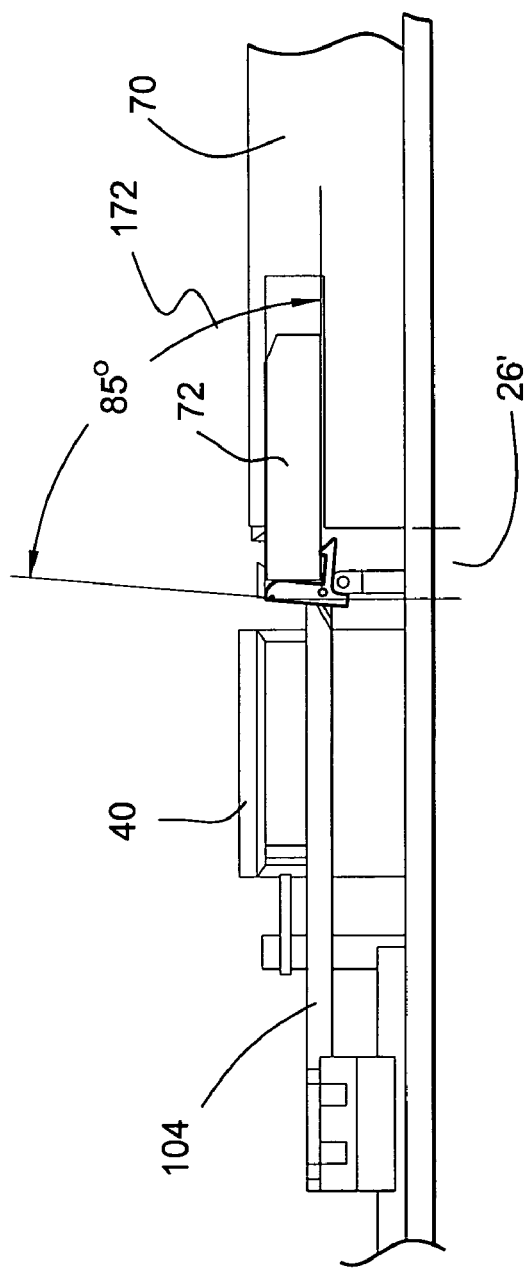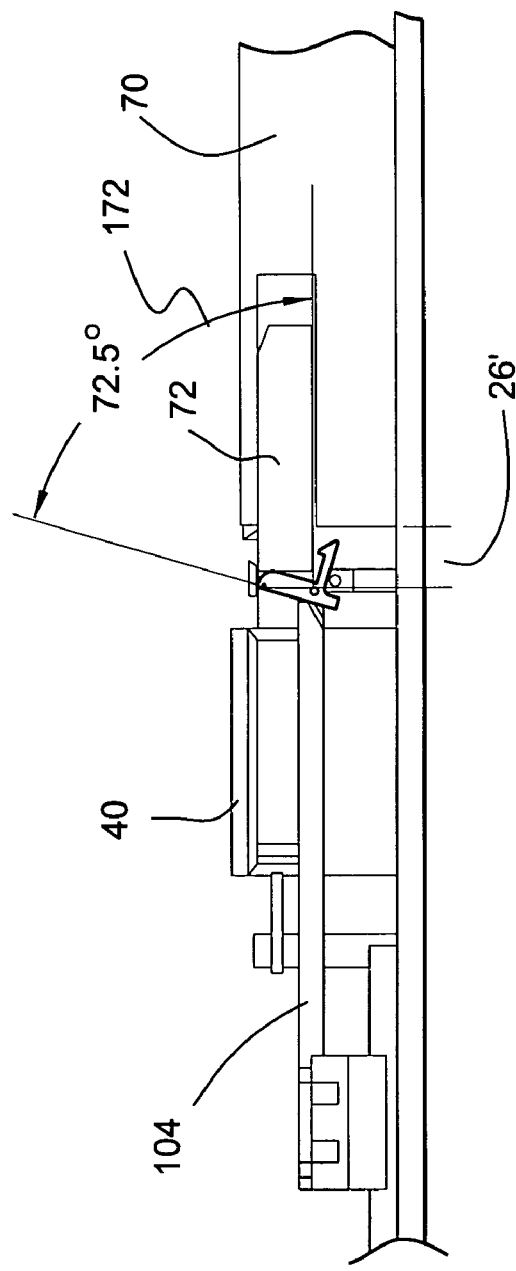

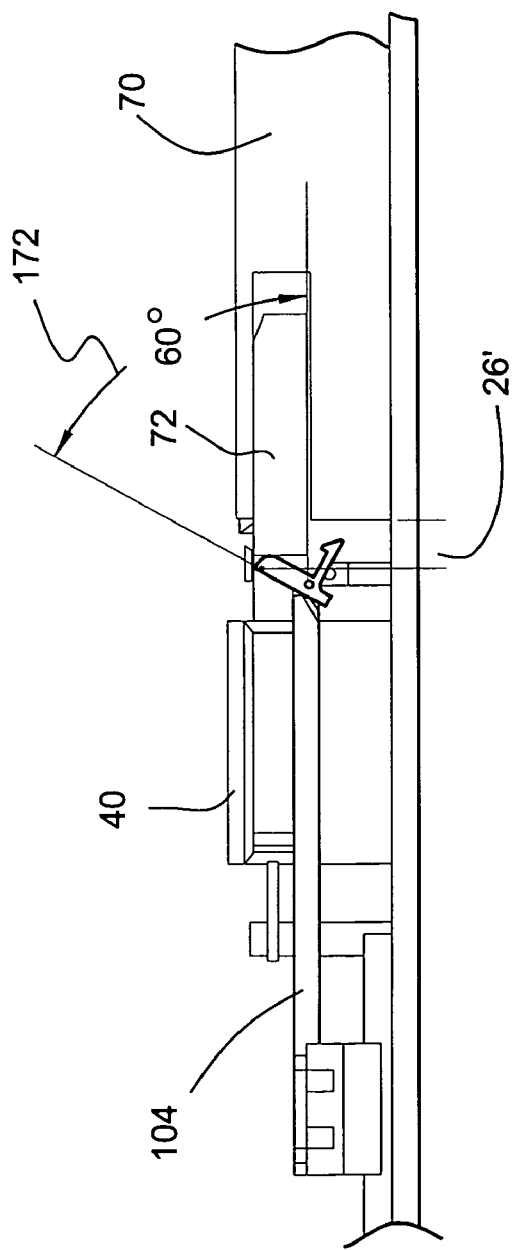
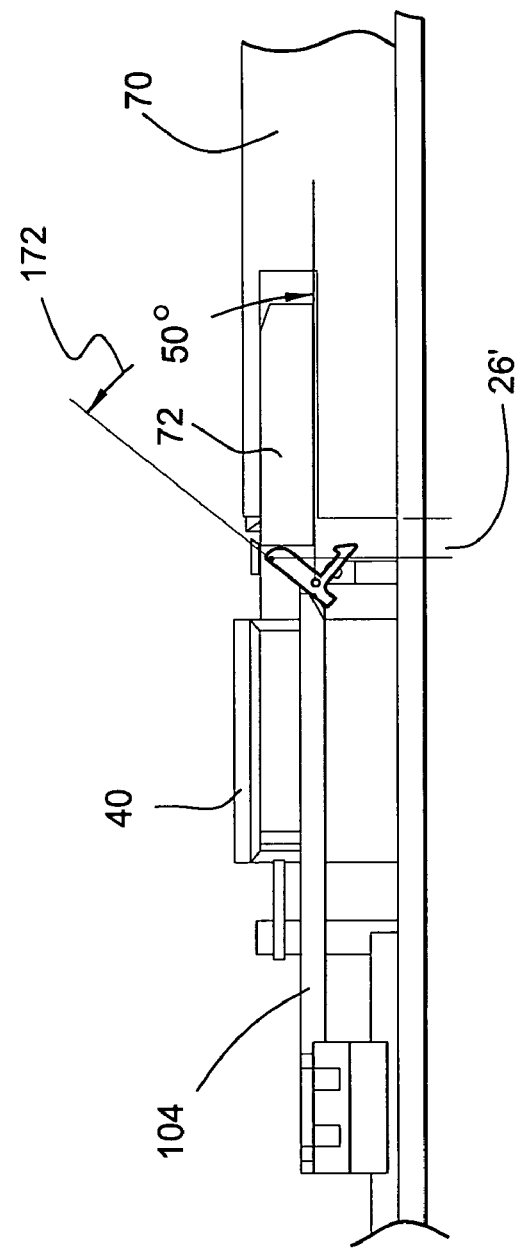

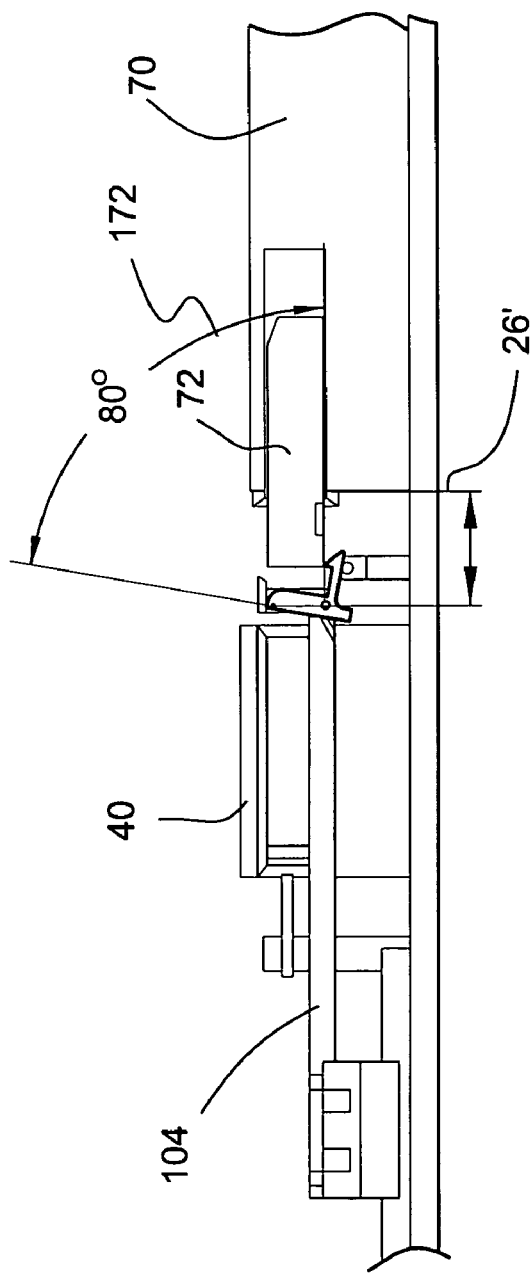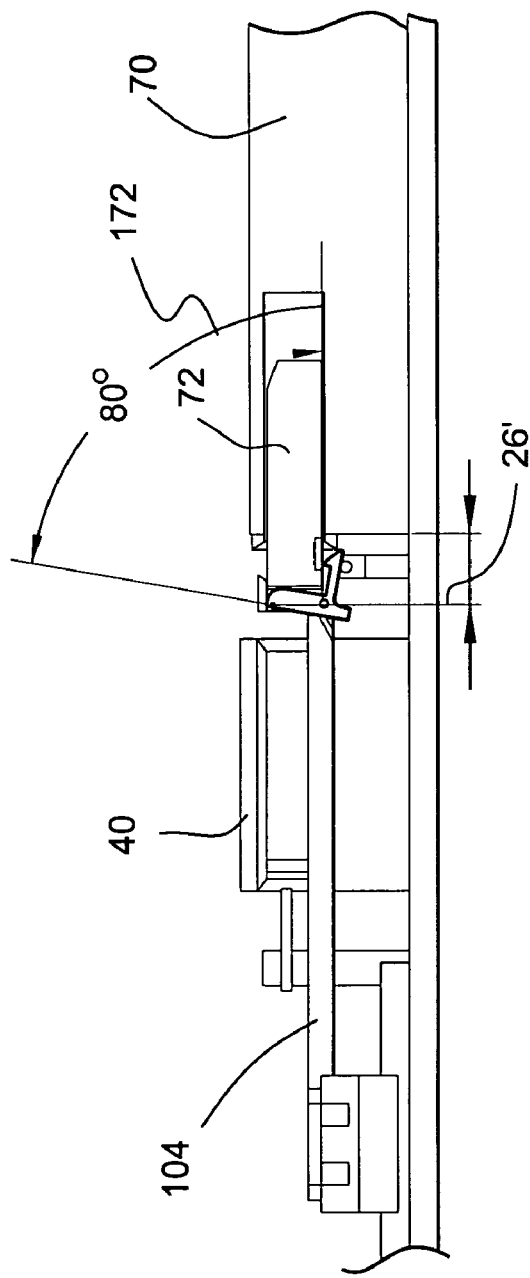

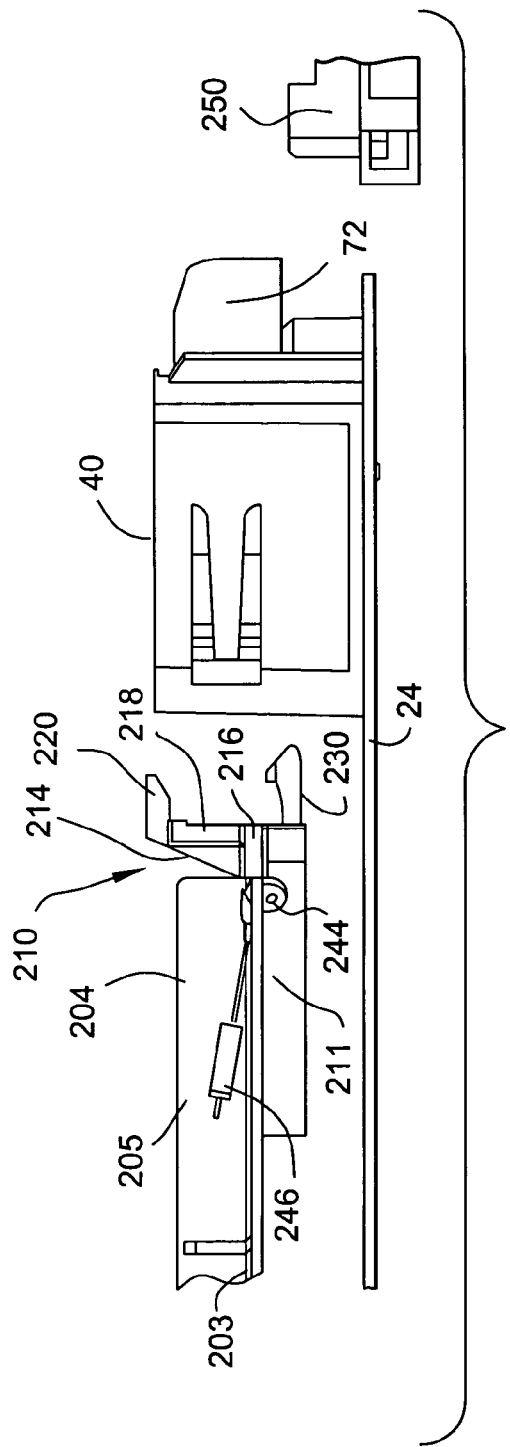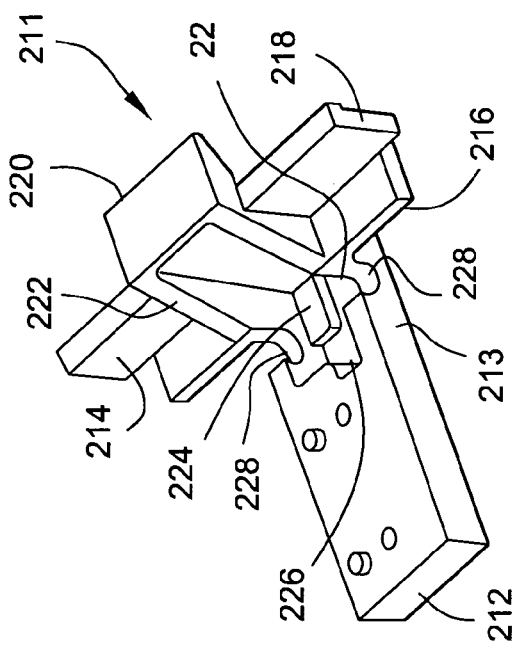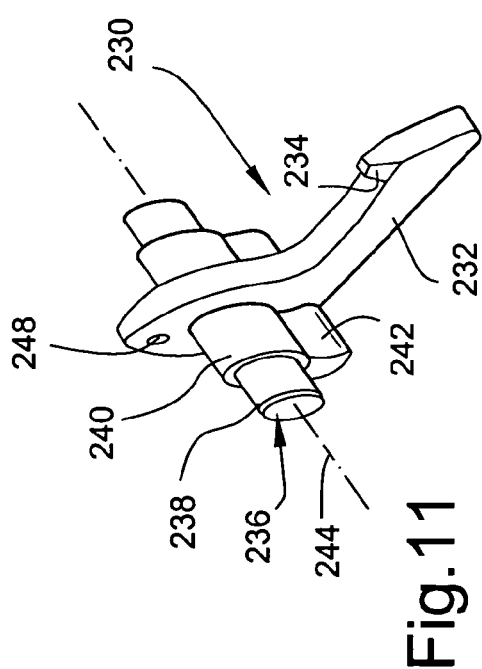

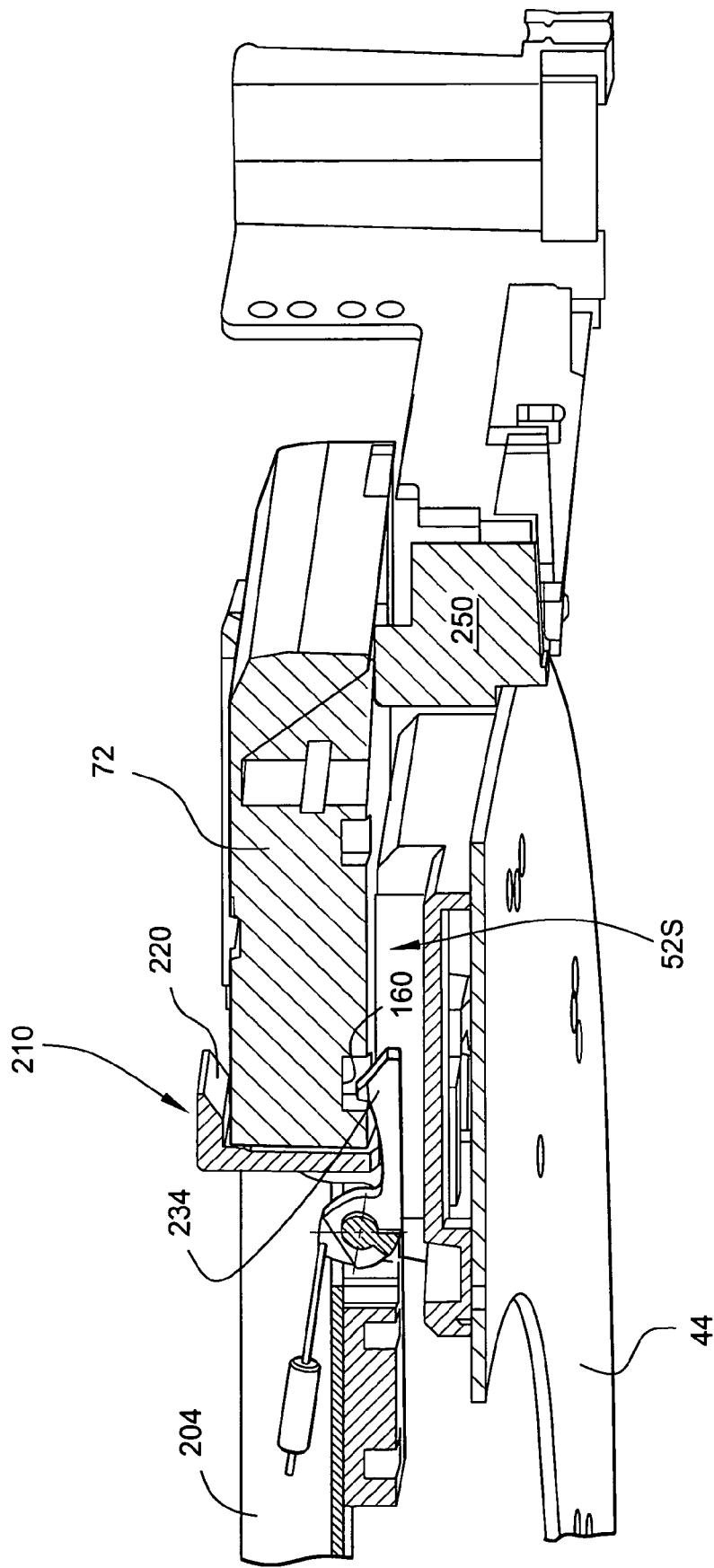
Fig.14C(1)

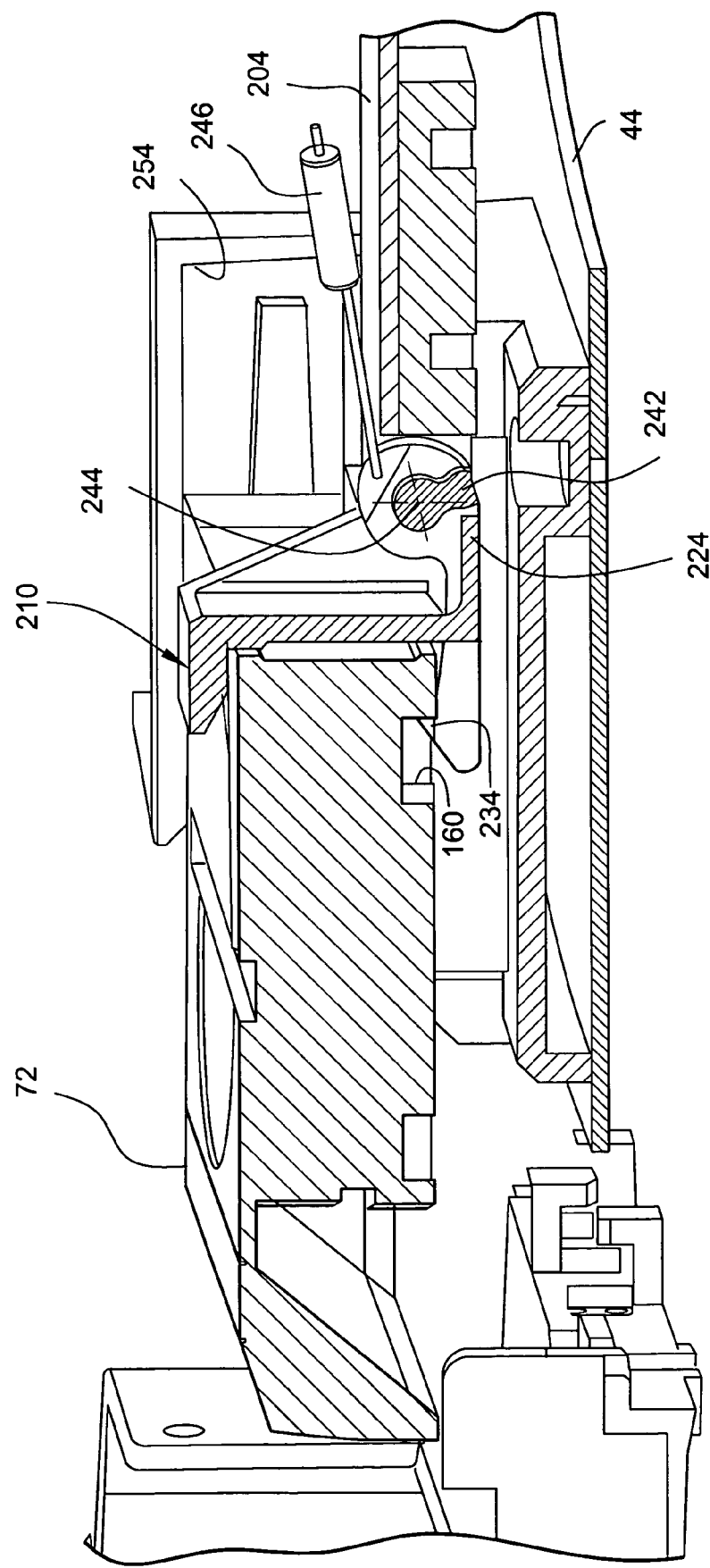
Fig.14C(2)

DATA CARTRIDGES HANDLER INCLUDING A RING-SHAPED CAROUSEL AND A PICKER WITHIN THE INNER PERIPHERY OF THE CAROUSEL

BACKGROUND

1. Field of the Invention

The present invention pertains to the storage of information, and particularly to automated cartridge handling systems such as cartridge autoloaders and cartridge libraries which store cartridges or cassettes of magnetic tape.

2. Related Art and Other Considerations

In the early days of computers, information requiring storage could be transmitted from a computer to a tape drive. At the tape drive the information was magnetically recorded on or read from a large reel of tape. Upon completion of an operation of recording on the tape, for example, the reel would be removed manually from the tape drive and mounted in a rack. Another reel from the rack could then be manually mounted, if necessary, in the drive for either an input (tape reading) or output (recording to tape) operation.

Eventually it became popular to enclose magnetic tape in a cartridge, the cartridge being considerably smaller than the traditional tape reels. Initially such tape cartridges were employed for use in a "tape deck" for reproduction of audio information (e.g., music), but subsequently such tape cartridges, in differing sizes, were used to store such information as computer data. For years now magnetic tape cartridges have proven to be an efficient and effective medium for data storage, including but not limited to computer back-up.

Computer systems often need to access several cartridges. To this end, automated cartridge handling systems, often generally referred to as cartridge libraries, have been utilized for making the cartridges automatically available to the computer. Some of the relatively smaller types of cartridge libraries are typically referred to as autoloaders.

Typically, prior art automated cartridge handling systems have an array of storage positions for cartridges, one or more tape drives, and some type of automated changer or cartridge engagement/transport mechanism for picking or gripping a cartridge and moving the cartridge between a storage position and the tape drive. Autoloaders typically have but one drive, and a fairly small number of storage positions or cells.

Important to the automation of cartridge handling systems as previously known has been the provision of the cartridge changer or cartridge engagement/transport mechanism for picking or gripping a cartridge and moving the cartridge between a storage position and the tape drive. Such rotobic mechanisms, often called a cartridge "picker" or "gripper", are typically mounted in a handling system (e.g., library or autoloader) frame in order to introduce and remove cartridges relative to one or more stationary drives.

The following United States patents and patent applications, all commonly assigned herewith and incorporated herein by reference, disclose various configurations of automated cartridge libraries, as well as subcomponents thereof (including cartridge engagement/transport mechanisms, entry/exit ports, and storage racks for housing cartridges):

U.S. Pat. No. 4,984,106 to Herger et al., entitled "CARTRIDGE LIBRARY SYSTEM AND METHOD OF OPERATION THEREOF".

U.S. Pat. No. 4,972,277 to Sills et al., entitled "CARTRIDGE TRANSPORT ASSEMBLY AND METHOD OF OPERATION THEREOF".

U.S. Pat. No. 5,059,772 to Younglove, entitled "READING METHOD AND APPARATUS FOR CARTRIDGE LIBRARY".

U.S. Pat. No. 5,103,986 to Marlowe, entitled "CARTRIDGE RACK".

U.S. Pat. Nos. 5,237,467 and 5,416,653 to Marlowe, entitled "CARTRIDGE HANDLING APPARATUS AND METHOD WITH MOTION-RESPONSIVE EJECTION".

U.S. Pat. No. 5,498,116 to Woodruff et al., entitled "ENTRY-EXIT PORT FOR CARTRIDGE LIBRARY".

U.S. Pat. No. 5,487,579 to Woodruff et al., entitled "PICKER MECHANISM FOR DATA CARTRIDGES".

U.S. Pat. No. 5,718,339 to Woodruff et al., entitled "CARTRIDGE RACK AND LIBRARY FOR ENGAGING SAME".

U.S. Pat. No. 5,739,978, entitled "CARTRIDGE HANDLING SYSTEM WITH MOVING I/O DRIVE".

U.S. Pat. No. 6,008,964, entitled "CARTRIDGE LIBRARY AND METHOD OF OPERATION THEREOF".

U.S. patent application Ser. No. 08/970,205, entitled "CARTRIDGE LIBRARY WITH CARTRIDGE LOADER MOUNTED ON MOVEABLE DRIVE ASSEMBLY".

U.S. Pat. No. 6,005,745, entitled "CARTRIDGE LIBRARY WITH ENTRY/EXIT PORT AND METHOD OF OPERATION THEREOF".

U.S. Pat. No. 6,175,467, entitled "DATA CARTRIDGE LIBRARY WITH CARTRIDGE TRANSPORT ASSEMBLY".

U.S. Pat. No. 6,239,941, entitled "CARTRIDGE LIBRARY AND METHOD OF OPERATION".

U.S. Pat. No. 6,144,521, entitled "TAPE CARTRIDGE MAGAZINE WITH STRUCTURE TO PREVENT IMPOROPER LOADING OF CARTRIDGES".

U.S. Pat. No. 6,236,530, entitled "DATA CARTRIDGE LIBRARY HAVING A PIVOTING CARTRIDGE TRANSPORT".

U.S. Pat. No. 6,229,666, entitled "DATA CARTRIDGE LIBRARY HAVING A PIVOTING CARTRIDGE TRANSPORT".

U.S. Pat. No. 6,233,111, entitled "DATA CARTRIDGE LIBRARY HAVING A PIVOTING CARTRIDGE TRANSPORT AND A CARTRIDGE STATUS INDICATOR".

U.S. Pat. No. 6,466,396, entitled "CARTRIDGE LIBRARY".

U.S. Pat. No. 6,385,003, entitled "CARTRIDGE LIBRARY".

U.S. Pat. No. 6,462,900, entitled "CARTRIDGE PICKER ROBOT WITH RIBBON CABLE FOR CARTRIDGE LIBRARY".

U.S. Design Pat. No. D456,404, entitled "CARTRIDGE LIBRARY".

U.S. Design Pat. No. D464,354, entitled "CARTRIDGE MAGAZINE".

U.S. Pat. No. 6,612,499, entitled "CALIBRATION SCHEME FOR AUTOMATED TAPE LIBRARY".

U.S. Pat. No. 6,473,261, entitled "CARTRIDGE OVER-INSERTION PROTECTION FOR CARTRIDGE LIBRARY".

U.S. Design Pat. No. D415,126, entitled "CARTRIDGE LIBRARY".

BRIEF SUMMARY

A data cartridge handling apparatus comprises a ring-shaped carousel rotatably mounted within a housing. Cartridge-accommodating cells are angularly arranged about the carousel between an inner periphery and an outer periphery of the carousel. A transducing drive is mounted within the housing and outside the outer periphery. A motor rotates the carousel to facilitate selective alignment of a selected cell with the drive along a radial dimension of the carousel.

A picker is mounted within the housing at a point within the inner periphery of the carousel. The picker has a picker arm. A distal end of the picker arm has a gripper which selectively engages and disengages a data cartridge. The picker arm linearly translates in the radial dimension for the purpose of moving an engaged data cartridge from the selected cell to a loading position of the drive, and conversely for unloading a data cartridge from the drive and withdrawing the same into the selected cell.

The gripper comprises a thumb. One of the gripper and the thumb is pivotally connected to the picker arm to allow the thumb to selective engage and disengage a feature on a data cartridge. The gripper is nominally biased toward a picker-arm-aligned position by biasing means, such as a spring. A trip member is mounted in the housing between the outer periphery of the carousel and the drive for actuating pivoting of the gripper (when a biasing force of the biasing means is overcome), and thereby actuating the selective disengagement of the picker thumb with the feature on the data cartridge for loading of the data cartridge into the drive.

In an illustrated embodiment, the feature on the data cartridge which is engaged by the thumb of the gripper is preferably a reel lock notch formed on an underside of the data cartridge. In particular, the thumb has a projection formed thereon which extends into the reel lock notch during the selective engagement. In the illustrated embodiment, the feature is specifically a reel lock notch formed on an underside of an industry standard data cartridge which accommodates 8 millimeter magnetic tape.

Preferably, the form factor for the data cartridge handling apparatus is such that the housing is sized to fit into a standard seventeen inch equipment rack. To this end, in an illustrated example embodiment, the carousel comprises ten cells. Along an axis of rotation of the carousel, the housing has a height substantially equal to a height of the drive (e.g., a height of 1.75 inches). The carousel has a diameter of approximately seventeen inches.

In one example embodiment, the projection on the gripper thumb has an essentially right triangular shape with a truncated apex angle formed as a notch engagement surface. The finger of the gripper has a curved cartridge loading surface adapted to contact and urge the data cartridge into the drive. A first surface of the finger and a first surface of the thumb are oriented substantially orthogonally to form an essentially L-configured cartridge contacting profile. A pivot axis of the gripper is situated proximate an intersection of first surface of the finger and the first surface of the thumb. The gripper has a spur which contacts the trip member during pivoting actuation of the gripper. The spur is an extension of the finger beyond the intersection.

In another example embodiment, the gripper comprises a pawl assembly which is pivotally connected to the picker arm and which slides in the radial direction. The pawl assembly has an axle; the axle carries a first follower and a second follower. The first follower selectively contacts the trip member for actuating the pivoting of the gripper and thereby the selective disengagement. The gripper has a cam formed thereon. The gripper has a channel, and further comprises biasing means which exerts a biasing force for urging the axle into a first position in the channel. When the picker arm linearly translates while the thumb engages the data cartridge and while the data cartridge is held stationary, the biasing force is overcome whereby the axle slides in the radial direction in the channel. When the axle reaches a second position in the channel the second follower contacts the cam, linear translation of the picker arm while the second follower contacts the cam causes the thumb to disengage the feature on the data cartridge. The first follower and the second follower are preferably situated on opposite sides of a pawl thumb.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5A–FIG. 5E are diagrammatic side view of portions of the data cartridge handling apparatus of FIG. 1 in successive stages of a cartridge retraction operation or (in reverse sequence) a cartridge retraction operation.

FIG. 6A–FIG. 6E are diagrammatic side view of portions of the data cartridge handling apparatus of FIG. 1 in successive stages of a cartridge loading operation.

FIG. 7A–FIG. 7C are diagrammatic side view of portions of the data cartridge handling apparatus of FIG. 1 in successive stages of a cartridge fetching operation.

FIG. 9 is a partially sectioned side view of portions of the data cartridge handling apparatus of FIG. 8.

FIG. 10 is a perspective view of a pawl tray of a gripper of the picker arm of the data cartridge handling apparatus of FIG. 8.

FIG. 11 is a perspective view of a pawl assembly of a gripper of the picker arm of the data cartridge handling apparatus of FIG. 8.

FIG. 14A–FIG. 14B, FIG. 14C(1)–FIG. 14C(2)

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
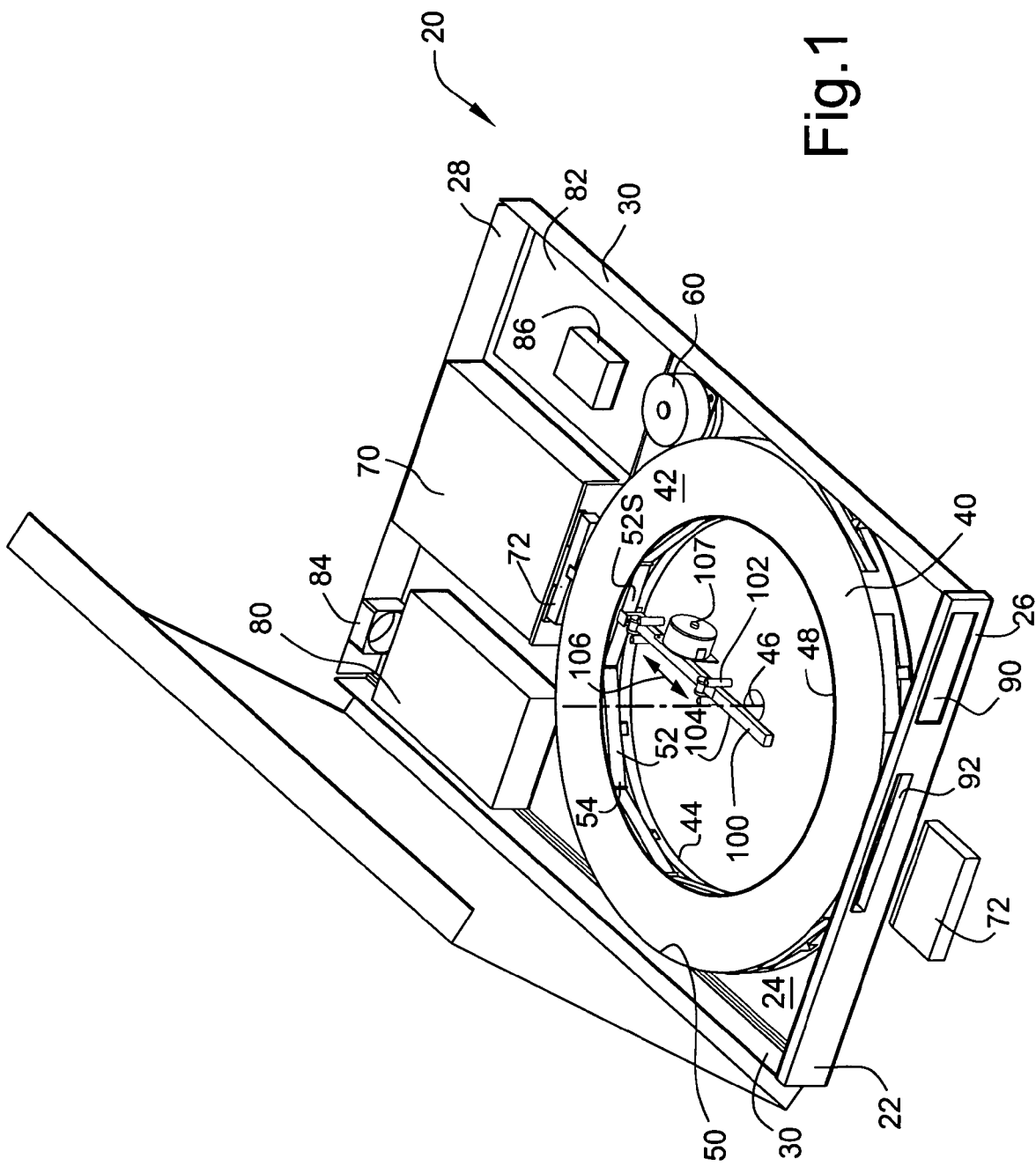
FIG. 1 is a perspective view of an example embodiment of a data cartridge handling apparatus, the apparatus having an open cover.

An example, representative, non-limiting first embodiment of a data cartridge handling apparatus 20 is shown in FIG. 1. The data cartridge handling apparatus 20 comprises a housing 22 which comprises base plate 24; front bezel 26; rearwall 28; sidewalls 30; and, cover 32.

A ring-shaped carousel 40 is rotatably mounted within housing 22. The carousel comprises a carousel topwall 42 and a carousel bottom wall 44, both walls 42 and 44 being flat and essentially disk-shaped. Both carousel topwall 42 and carousel bottom wall 44 are centered about carousel axis 46. The carousel axis 46 extends perpendicularly from base plate 24. Both carousel topwall 42 and carousel bottom wall 44, and thus carousel 40 generally, have an inner periphery 48 and an outer periphery 50.

Plural cartridge-accommodating cells 52 are angularly arranged about the carousel 40. In a height direction of data cartridge handling apparatus 20, each cell cartridge-accommodating cells 52 extends between carousel topwall 42 and carousel bottom wall 44. In a radial dimension of carousel 40, each cell 52 extends essentially between inner periphery 48 and outer periphery 50. Vertical cell dividing walls 54 are provided for defining the cells in an angular dimension about carousel axis 46, and preferably at regular angular intervals about carousel axis 46.

A motor 60, operating in conjunction with transmission means, rotates the carousel 40 about carousel axis 46. In the illustration embodiment of FIG. 1, the motor 60 is mounted on base plate 24 in housing 22 to the rear of carousel 40. In one embodiment, the transmission means employs toothed gearing between a circumferential portion of carousel bottom wall 44 and an output shaft of motor 60. The relative rotational position of the carousel 40 can be determined relative to a reference point or home position of the carousel 40. For example, a home sensor can detect a flag on the rotating carousel 40, and the angular displacement of the carousel 40 from the home position can be determined by counting pulses of the rotating motor shaft.

The motor may be situated in alternate locations. In addition, any other suitable transmission means can be employed in order to apply the takeoff from the motor to the carousel 40, such as a belt which entrains an output shaft of motor 60 and a circumferential portion of carousel 40, for example. Further, other sensing arrangements can also be employed.

A transducing drive 70 is mounted within the housing 22 and outside the outer periphery 50. The drive 70 is mounted on base plate 24 in housing 22 to the rear of carousel 40, and is situated essentially centrally with respect to a width dimension of the housing 22. The motor 60 rotates the carousel 40 to facilitate selective alignment of the selected cell 52S with the drive 70 along a radial dimension of the carousel 40.

In being a "transducing" drive 70, the drive 70 is capable of recording (writing) or reproducing (reading) information with respect to a data cartridge 72 inserted therein. In an example, illustrated, non-limiting embodiment, the data cartridge 72 contains magnetic tape. For example, the drive 70 can be a VXA-1 or VXA-2 model drive marketed by Exabyte Corporation. Such example drive is particularly useful for transducing information with respect to a data cartridge 72 of eight millimeter magnetic tape.

Also positioned within housing 22 of data cartridge handling apparatus 20 are power supply 80 and circuit board 82. A fan 84 is mounted on rearwall 28 proximate power supply 80 for cooling of the interior of data cartridge handling apparatus 20 and power supply 80 in particular. The circuit board 82 includes, e.g., a controller 86 which can take the form of a microprocessor or the like.

The front bezel 26 of data cartridge handling apparatus 20 includes a control panel 90. The control panel 90 has an unillustrated display (e.g., LCD or LED readout) for providing status information or facilitating interaction with a user, as well as user input means (e.g., keyboard or touchscreen).

The front bezel 26 of data cartridge handling apparatus 20 is also provided with an entry/exit port 92. The entry/exit port 92 is an opening in front bezel 26 which permits insertion or withdrawal of data cartridge 72 into a forwardmost cell 52 of carousel 40.

The data cartridge handling apparatus 20 also includes a picker 100 which is mounted within the housing 22 at a point 102 within the inner periphery 48 of the carousel 40. The picker has an elongated picker arm 104 which extends along a radial dimension of carousel 40 and extends parallel to sidewalls 30 of housing 22. The picker arm 104 linearly translates in the radial dimension (e.g., in the direction depicted by arrow 106 in FIG. 1) for the purpose of moving an engaged data cartridge from the selected cell 52S to a loading position of the drive 70, and conversely for unloading a data cartridge from the drive 70 and withdrawing the same into the selected cell 52S.

Figure 4:
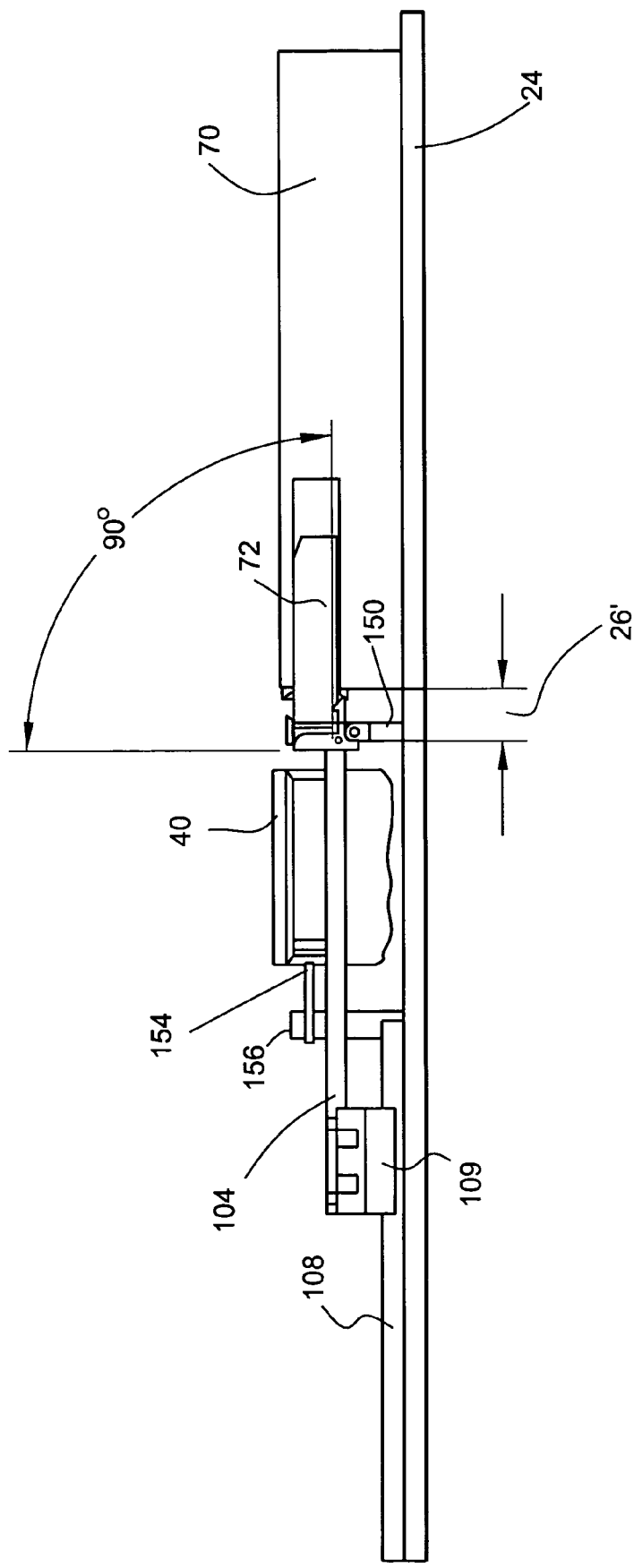
FIG. 4 is a diagrammatic side view of portions of the data cartridge handling apparatus of FIG. 1.

Linear translation of picker arm 104 in direction 106 is accomplished by picker motor 107. An output shaft of picker motor 107 can act through a rack and pinion type arrangement for translating the picker arm 104. As shown in FIG. 4, the rack and pinion arrangement can comprise a linear guideway 108 (formed on base plate 24) and a linear bearing 109 which facilitates linear movement of picker arm 104.

Other ways of actuating the picker arm 104 are also possible. Further, the picker arm 107 has a sensed home position. The degree of rotation of picker motor 108 coupled with information related to detection of the home position is utilized to determine the position of the picker arm 104 at an given moment.

Figure 2:
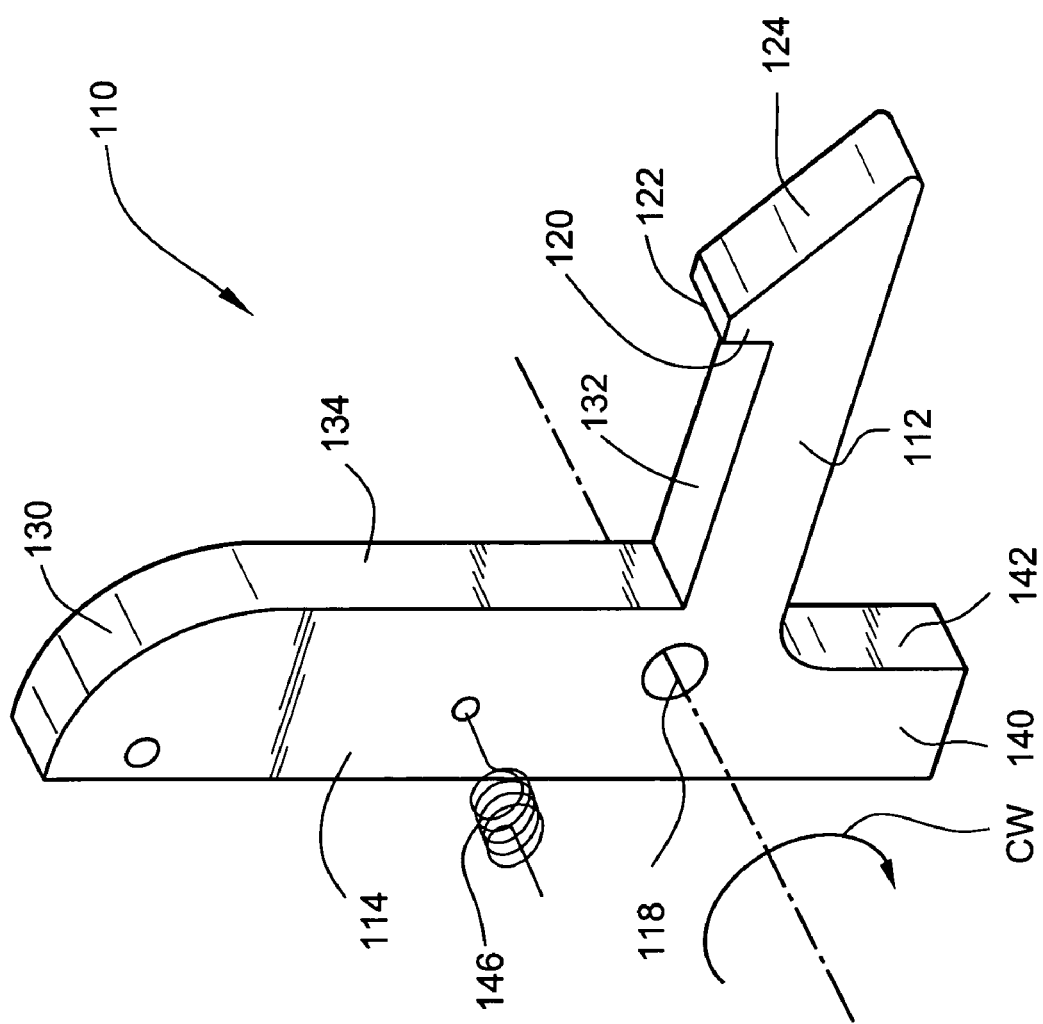
FIG. 2 is a side perspective view of a gripper portion of a picker arm of the data cartridge handling apparatus of FIG. 1.

As shown in FIG. 2, a distal end of the picker arm 104 has a gripper 110 which selectively engages and disengages the data cartridge. The gripper 110 comprises a thumb 112 and a finger 114. Preferably the thumb 112 and finger 114 are integral with one another. The gripper 110 is pivotally connected to the picker arm 104 at pivot point 118 to allow selective engagement and disengagement of the thumb 112 with a feature on the data cartridge.

In the illustrated example embodiment, the thumb 112 of gripper 110 has a thumb projection 120. The thumb projection 120 has an essentially right triangular shape with a truncated apex angle formed as a notch engagement surface 122. An hypotenuse 124 of thumb projection 120 serves as a ramp surface for thumb 112.

The finger 114 of the gripper 110 has a curved cartridge loading surface 130 adapted to contact and urge the data cartridge into the drive. A first surface 132 of the thumb 112 and a first surface 134 of finger 114 are oriented substantially orthogonally to form an essentially L-configured cartridge contacting profile. The pivot axis 118 of the gripper 110 is situated proximate an intersection of first surface 132 of the thumb 112 and the first surface 134 of finger 114. The gripper 110 also has a spur 140 which is an extension of the finger 114 beyond the intersection, e.g., below pivot point 118. The spur 140 has a trip surface 142.

The gripper 110 is nominally biased toward a picker-arm-aligned position by biasing means, such as a torsion spring 146. Preferably the torsion spring biases the gripper 110 so that the finger 114 is oriented vertically. In other words, the torsion spring 146 biases the gripper 110 to an upright picker-arm-aligned position as shown in FIG. 2.

A forward trip member 150 is mounted in the housing between the outer periphery 50 of the carousel 40 and the drive 70. The forward trip member 150, shown in FIG. 4, can be provided in various forms, such as a post or projection which extends or upstands perpendicularly from base plate 24. As the picker 100 extends radially toward the drive 70 to a point at which the trip member 150 bears against trip surface 142 (see FIG. 2), and the biasing force of biasing spring 146 is overcome, the forward trip member 150 actuates pivoting of the gripper 110 about pivot point 118. As described herein, the pivoting of gripper 110 about pivot point 118 to a sufficient degree causes disengagement of the picker thumb 112 relative to the feature (e.g., reel lock notch 160) on the data cartridge 72, thereby facilitating loading of the data cartridge into the drive 70.

A rear trip member 154 also selectively acts upon gripper 110 depending on the position of picker arm 100. The rear trip member 154 is situated interior of the inner periphery 48 of carousel 40 proximate the position at which the selected cell 52S is aligned with drive 70 along a radial dimension of the carousel 40. As shown in FIG. 4, the rear trip member 154 can take the form of a projection or finger which is held aloft on a post 156 above base plate 24 and which extends parallel in the linear direction of motion of picker arm 104 (in the direction of arrow 106). The distal tip of rear trip member 154 is positioned at a point which contacts the rear of finger 114 when the gripper 110 has a desired orientation upon a cartridge being fully retracted into the selected cell 52S. In the desired orientation finger 114 has an essentially vertical posture (such as that depicted in FIG. 2). The rear trip member 154 is situated so as not to bear against the rear of finger 114, but not otherwise interference with translation of the picker arm 104.

Figure 3:
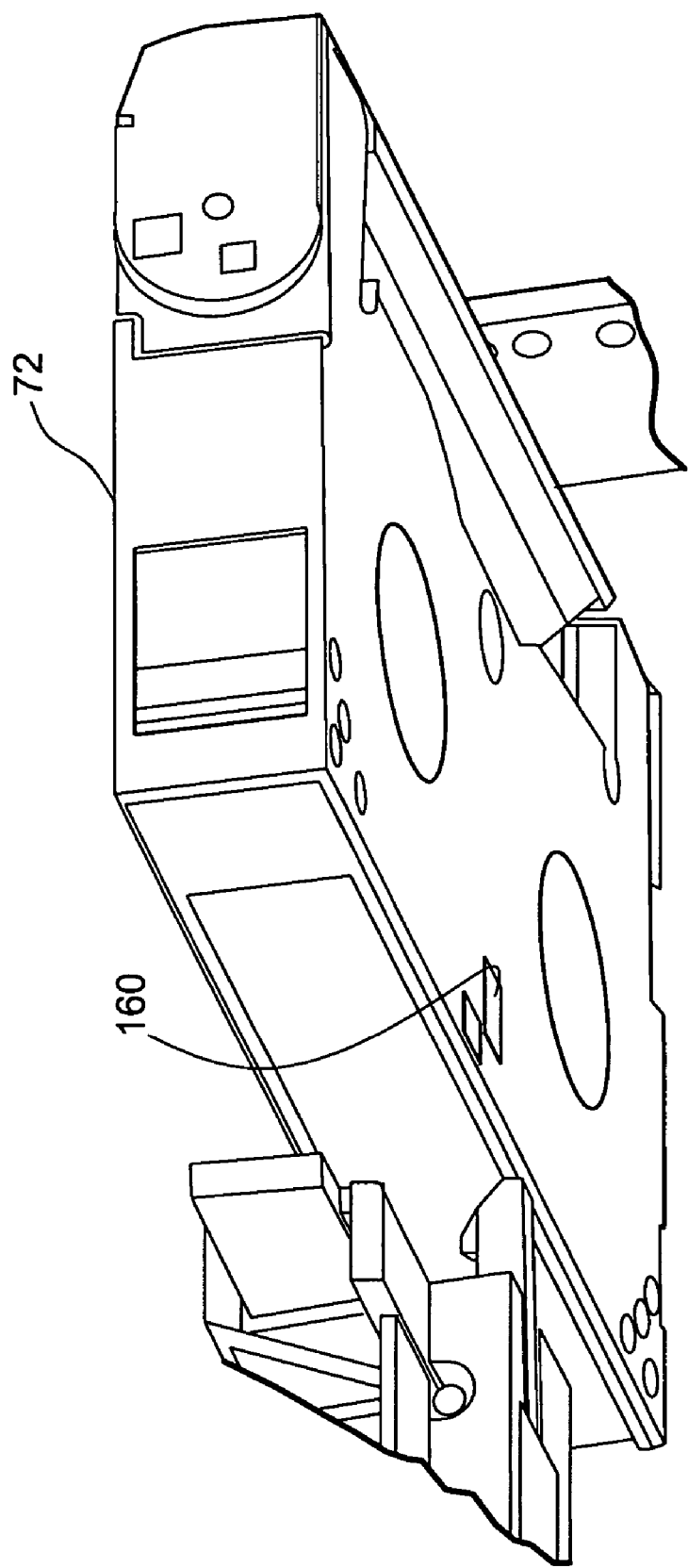
FIG. 3 is a perspective view of a cartridge of a type which can be manipulated by a cartridge handling apparatus such as the apparatus of FIG. 1.

FIG. 3 shows a bottom perspective view of an example, representative data cartridge 72 employed with an illustrated embodiment of data cartridge handling apparatus 20. In this illustrated embodiment, the feature on the data cartridge 72 which is engaged by the thumb 112 of the gripper 110 is preferably a reel lock notch 160 formed on an underside of the data cartridge 72. In particular, the thumb projection 120 on thumb 112 of picker 100 extends into the reel lock notch 160 during the selective engagement, and is withdrawn from reel lock notch 160 during the pivoting of thumb 112 about pivot point 118 during a cartridge load operation. In the example illustrated embodiment, the reel lock notch 160 is formed on an underside of an ANSI Standard data cartridge which accommodates 8 millimeter magnetic tape. It should be understood that, with respect to other types of cartridges, the gripper 110 can engage other features, particularly other features provided on an underside or bottom surface of a data cartridge.

Preferably, the housing 22 of data cartridge handling apparatus 20 is sized to fit into a standard seventeen inch equipment rack. To this end, in an illustrated example embodiment, the carousel 40 comprises ten cells. Along the axis 46 of rotation of the carousel 40, the housing 22 has a height substantially equal to a height of the drive 70 (e.g., a height of 1.75 inches). In this illustrated embodiment, the carousel 40 has a diameter of approximately seventeen inches.

Various cartridge manipulation operations are described herein with reference to FIG. 5A–FIG. 5E, FIG. 6A–FIG. 6E, and FIG. 7A–FIG. 7C. Each stage of these operations is characterized, e.g., by a certain distance separating the axis 118 of gripper 110 and a plane 26' of the front bezel 26 of tape drive 70. This axis/bezel separation distance, depicted by arrow 170, differs for each stage of the operations. In addition, each stage of the operations of FIG. 5A–FIG. 5E, FIG. 6A–FIG. 6E, and FIG. 7A–FIG. 7C is characterized by an angular displacement 172 between a horizontal plane and a plane of the rear surface of gripper finger 114. Like the axis/bezel separation distance 170, the gripper finger angular displacement 172 differs for each stage of the operations. The specific values illustrated in FIG. 5A–FIG. 5E, FIG. 6A–FIG. 6E, and FIG. 7A–FIG. 7C for the axis/bezel separation distance 170 and gripper finger angular displacement 172 are peculiar to the particular embodiment illustrated, and that the axis/bezel separation distances 170 and gripper finger angular displacement 172 can have other values for other embodiments.

FIG. 5A–FIG. 5E show successive stages of cartridge engagement and retraction operations. Successive stages of a cartridge engagement are described in the sequence of FIG. 5A–FIG. 5E, while conversely successive stages of a cartridge retraction operation are described in a reverse sequence (e.g., FIG. 5E–FIG. 5A).

Figure 5E:
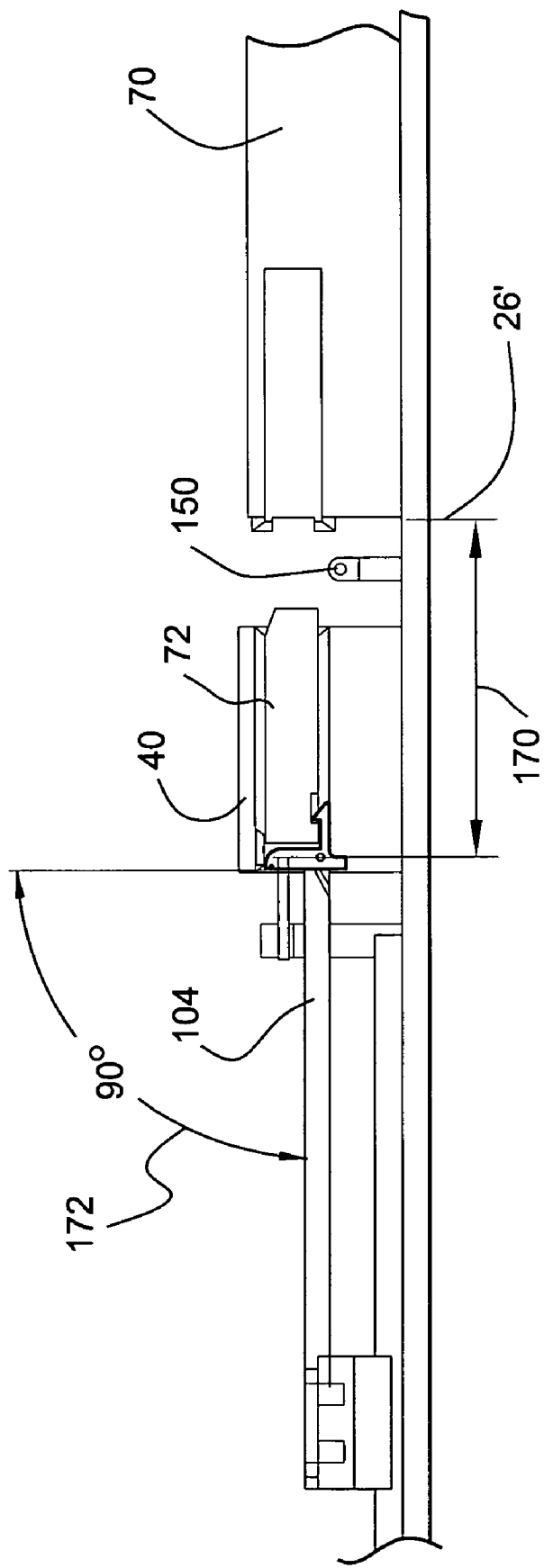

Describing the cartridge engagement operation, in FIG. 5A the picker 100 is at its farthest extent of travel from bezel plane 26'. The data cartridge 72 is situated in its nominal storage position in the selected cell 52S of carousel 40. The gripper 110 does not yet contact the data cartridge 72; the distal end of rear trip member 154 bears against the rear surface of finger 114. In each of the stages depicted by FIG. 5B–FIG. 5E the picker 100 with its gripper 110 is moved slightly but progressively closer to bezel plane 26'. In FIG. 5B the front surface of finger 114 bears against a surface of data cartridge 72. In FIG. 5C the thumb projection 120 of gripper 110 rides along the bottom of data cartridge 72. At the time of FIG. 5D, the notch engagement surface 122 of gripper 110 begins to enter the reel lock notch 160 on the bottom of data cartridge 72. In FIG. 5E, the thumb projection 120 of gripper 110 is fully inserted into and engaged with the reel lock notch 160, and the gripper finger angular displacement 172 is ninety degrees (e.g., the finger 114 of gripper 110 has an essentially vertical orientation).

Figure 6E:
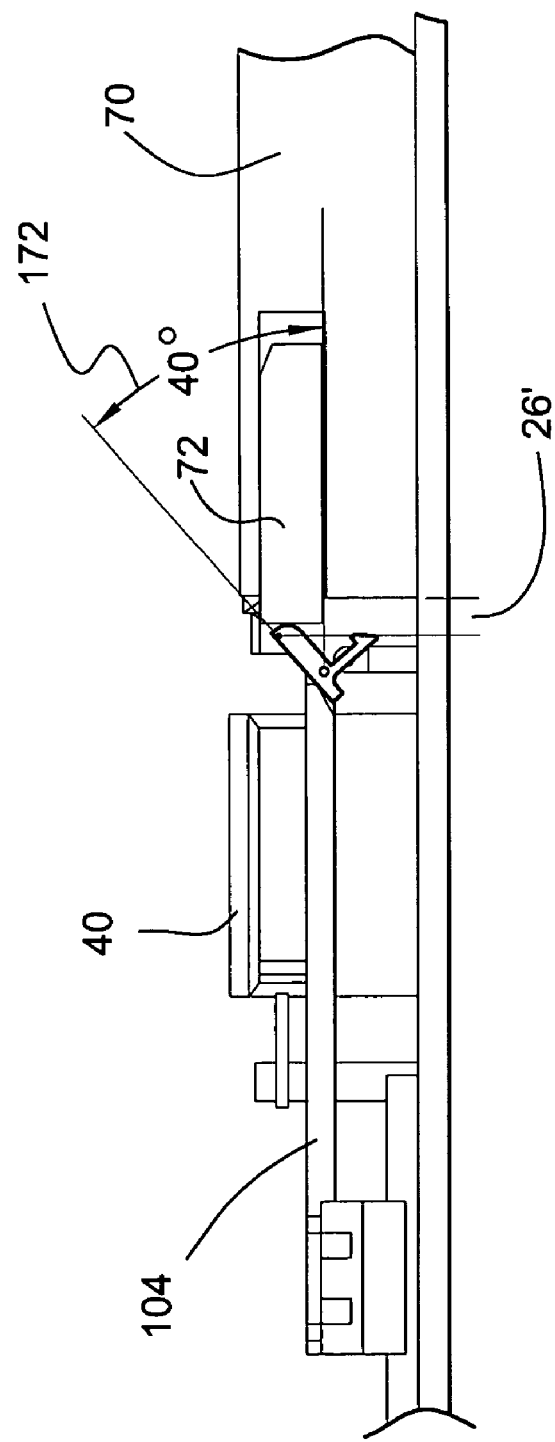

Once engaged by performance of operations such as those described above with reference to FIG. 5A–FIG. 5E, the picker 100 with its engaged data cartridge 72 is linearly displaced in the direction of arrow 106 toward bezel plane 26'. In so moving, the data cartridge 72 is pushed out of the selected cell 52S in carousel 40 and toward the tape drive 70. As the gripper 110 carrying the data cartridge 72 approaches tape drive 70, eventually (after the data cartridge 72 begins to enter tape drive 70) the trip surface 142 of gripper 110 strikes the forward trip member 150 as shown in FIG. 6A. This begins the final stages of a cartridge loading operation depicted in FIG. 6A–FIG. 6E.

As gripper 110 moves even closer toward bezel plane 26', the thumb projection 120 begins to recede from reel lock notch 160 as shown in FIG. 6B, while gripper 110 continues to push data cartridge 72 into tape drive 70. After receding from reel lock notch 160, the thumb projection 120 tracks along the bottom of the data cartridge 72 as data cartridge 72 is being further inserted into tape drive 70 (see FIG. 6C). FIG. 6D and FIG. 6E show thumb projection 120 pivoting away from data cartridge 72 while gripper 110 continues to push data cartridge 72 into its fully inserted position in tape drive 70 as shown in FIG. 6E. Although not shown as such, the picker 100 with its gripper 110 can then be withdrawn along direction 106 away from tape drive 70.

Assume that the picker 100 with its gripper 110 has been withdrawn from the immediate vicinity of tape drive 70, and that the data cartridge 72 has just been discharged from tape drive 70. In this assumption, the tape drive 70 is of a type that ejects the data cartridge 72 from tape drive 70 upon occurrence of some predetermined condition, e.g., end of a write or read operation. The picker 100 with its gripper 110 is then linearly translated toward tape drive 70 to begin a cartridge fetch operation, basic stages of which are shown in FIG. 7A–FIG. 7C.

Figure 7C:
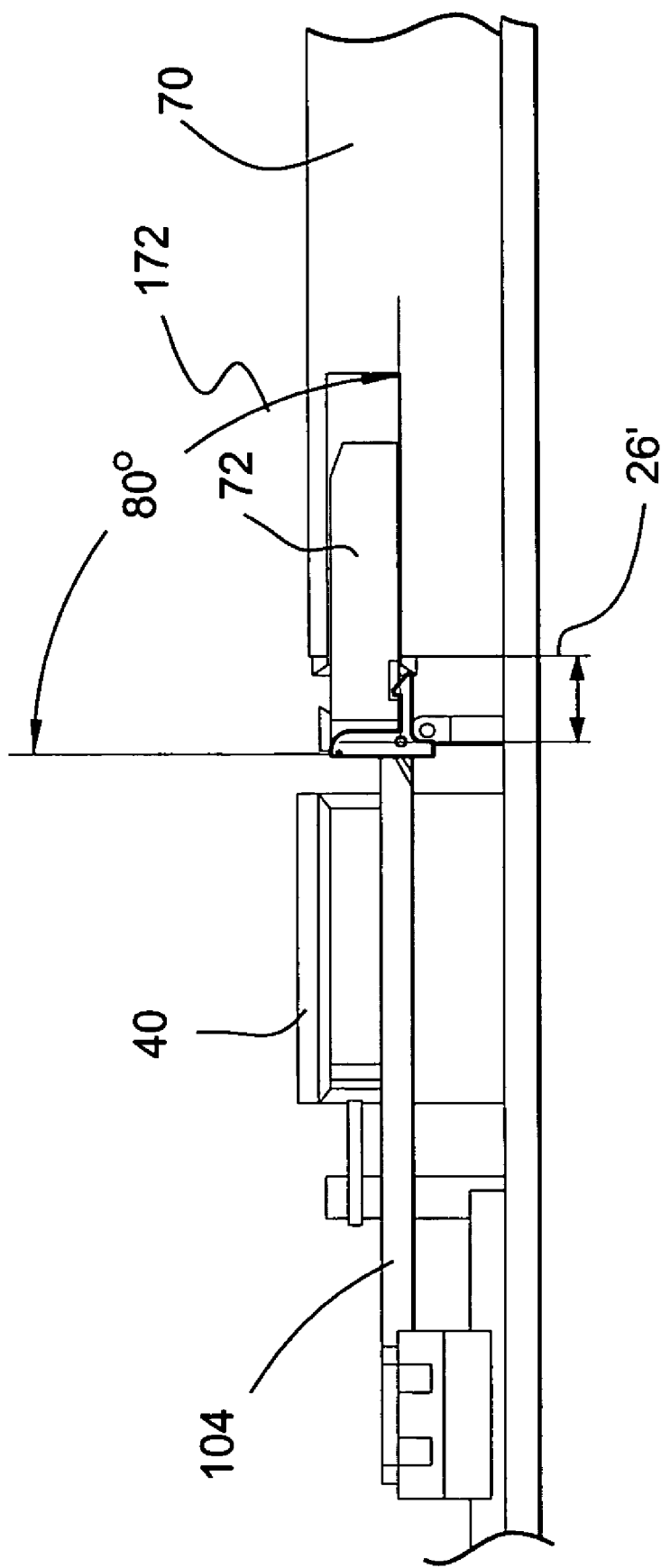

The stage of the cartridge fetch operation shown in FIG. 7A shows the data cartridge 72 as having been ejected from tape drive 70 and the gripper 110 having approached the data cartridge 72. In FIG. 7A, the thumb projection 120 of gripper 110 has started to ride just beneath the bottom surface of data cartridge 72 at the bezel edge. FIG. 7B shows gripper 110 continuing closer to data cartridge 72, so that finger 114 starts to begin to contact the protruding surface of data cartridge 72 and thumb projection 120 approaches reel lock notch 160 on the bottom of data cartridge 72. FIG. 7C shows the gripper 110 at its closest approach to bezel plane 26' in the fetch operation, with thumb projection 120 now fully inserted into reel lock notch 160 and finger 114 of gripper 110 oriented essentially vertically erect and aligned with the front surface of data cartridge 72. From the FIG. 7C position the picker 100, with gripper 110 engaging the data cartridge 72, can be withdrawn in a direction away from tape drive 70, so that stages of the cartridge retraction operation commence. The stages of the cartridge retraction operation are understood with reference to FIG. 5E–FIG. 5A. As indicated earlier, these stages are in the converse order of the cartridge engagement operation described by FIG. 5A–FIG. 5E.

Table 1 shows example values of the axis/bezel separation distance 170 and the gripper finger angular displacement 172 for the various stages of operations of the

TABLE 1

| FIG./Stage | axis/bezel separation distance (millimeters) | gripper finger angular displacement (degrees) |
| --- | --- | --- |
| FIG. 5A | 3.858 | 40 |
| FIG. 5B | 3.658 | 50 |
| FIG. 5C | 3.558 | 65 |
| FIG. 5D | 3.458 | 80 |
| FIG. 5E | 3.408 | 90 |
| FIG. 6A | 0.608 | 85 |
| FIG. 6B | 0.558 | 72.5 |
| FIG. 6C | 0.508 | 60 |
| FIG. 6D | 0.458 | 50 |
| FIG. 6E | 0.408 | 40 |
| FIG. 7A | 0.888 | 80 |
| FIG. 7B | 0.688 | 80 |
| FIG. 7C | 0.658 | 90 |

Figure 8:
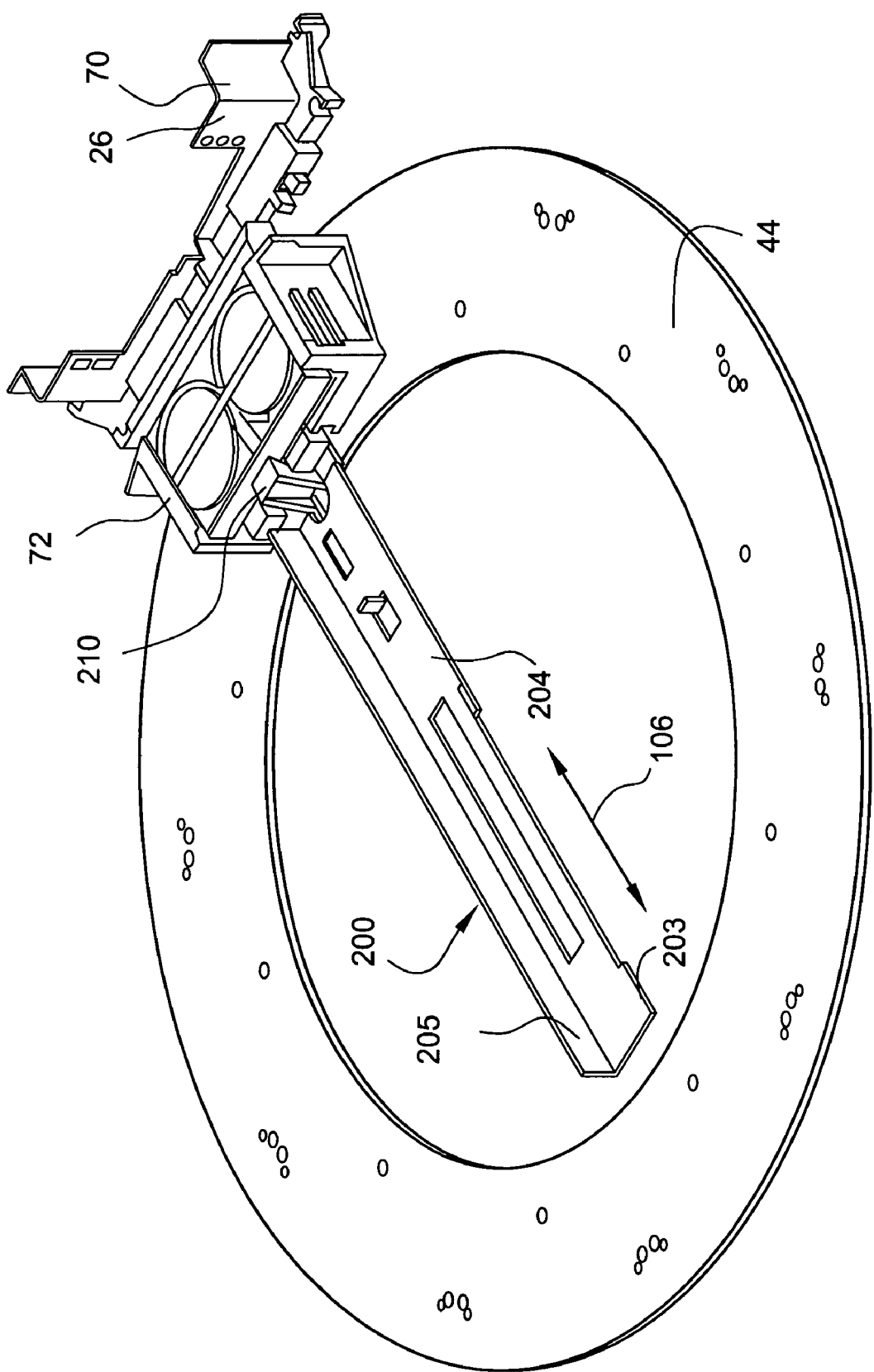
FIG. 8 is a perspective view of portions of a data cartridge handling apparatus having another embodiment of a picker arm.

FIG. 8 shows a second embodiment picker 200 which can be utilized in a data cartridge handling apparatus which, in respects other than the picker 200, is either identical or similar to the data cartridge handling apparatus 20 shown in FIG. 1. For sake of simplicity, FIG. 8 shows picker 200 relative to carousel bottom wall 44 (without showing the entire carousel 40) and to front bezel 26 of tape drive 70. The picker 200 comprises a picker arm 204 which translates in the direction depicted by arrow 106 and which carries a gripper 210. It will be understood that an unillustrated motor (but resembling, e.g., motor 107) accomplishes the linear translation of picker 200. In a plane perpendicular to its direction of motion the picker arm 204 has an L shape and is comprised of a horizontal arm plate 203 and a vertical bracket 205.

The gripper 210 is carried by picker arm 204 as shown in FIG. 9. The gripper 210 is comprised of a pawl tray 211. FIG. 10 shows the pawl tray 211 detached from picker arm 204. The pawl tray 211 has a pawl tray attachment block 212 which is secured by (e.g., four) fasteners or the like to an underside of horizontal arm plate 203 of picker arm 204. In addition, at its distal end the pawl tray 211 has two support arms 213 which carry a gripper blade assembly 214. The gripper blade assembly 214 has a horizontal base 216; an essentially vertical blade 218; and, a crown 220. The crown 220 is additionally supported by two spaced apart buttresses 222 which extend from horizontal base 216 and along a rear surface of blade 218. Near the base of one of the buttresses 222 and on the horizontal base 216 an essentially horizontal force sensitive knock off cam 224 is formed, the force sensitive knock off cam 224 being visible in FIG. 10.

The support arms 213 of pawl tray 211 are parallel to one another and extend generally in the direction of travel depicted by arrow 106. The support arms 213 are spaced apart to define pawl slot 226 therebetween. An underside of the horizontal base 216 in the region of pawl slot 226 forms a pawl upstop 227. Top surfaces of the support arms 213 have grooves 228 to provide axle channels.

FIG. 11 shows a pawl assembly 230 which is rotatably carried by pawl tray 211. The pawl assembly 230 includes a pawl thumb 232. The pawl thumb 232 is a cantilever member which extends essentially parallel to the direction of travel 106. At its distal end the pawl thumb 232 has thumb projection 234 extending upwardly therefrom. Near its proximal end the pawl thumb 232 has an axle 236 extending laterally from both sides. At its ends the axle 236 has essentially cylindrical axle end portions 238. Between axle end portions 238 and its junction with pawl thumb 232 the axle 236 has enlarged diameter axle midsections 240. One axle midsection 240 (shown as the left axle midsection 240 in FIG. 11) has a forward knockoff follower 242 formed thereon in the shape cam lobe which depends from the respective axle midsection 240. The other axle midsection 240 (shown as the right axle midsection 240 in FIG. 11) has a force sensitive knockoff follower 243 formed of essentially the same cam lobe shape. As explained hereinafter, in certain stages of operation the force sensitive knockoff follower 243 strikes force sensitive knock off cam 224. The axle end portions 238 fit loosely into the grooves 228 which form the axle channels in the top surfaces of the support arms 213 of pawl tray 211 (see FIG. 10). The axle 236 rotates about axis 244 (see FIG. 9 and FIG. 11), and also displaces or slides slightly along axis 244. That is, the grooves 228 are sized to allow the axle 236 of pawl assembly 230 both to slide (back and forth along the direction of arrow 106) and to rotate.

The pawl thumb 232 extends into pawl slot 226 below horizontal base 216 and force sensitive knock off cam 224, so that its distal end protrudes below and beyond blade 218 as shown in FIG. 9. The pawl assembly 230 is biased so that the pawl thumb 232 has an essentially horizontal orientation as shown in FIG. 9. The biasing can be accomplished, e.g., by any suitable biasing means such as, for example, a biasing spring 246. One end of biasing spring 246 is affixed to vertical bracket 205 of picker arm 204 as shown in FIG. 9. The other end of biasing spring 246 engages pawl assembly 230. FIG. 11 shows the other end of biasing spring 246 catching a spring hole 248 situated on a proximal portion of pawl assembly 230 above axis 244. With respect to grooves 228, ordinarily the axle 236 of pawl assembly 230 is biased or maintained by biasing spring 246 toward the proximal end of picker arm 204 (e.g., a "first position" in grooves 228) rather than toward gripper blade assembly 214.

FIG. 9 further illustrates a forward knockoff cam 250 which serves as a trip member to co-act with forward knockoff follower 242 on pawl assembly 230 when picker 200 with its gripper 210 is appropriately positioned. The forward knockoff cam 250 can be formed as a vertically extending flange or post mounted on base plate 24 or on any structure which might encase or house tape drive 70.

FIG. 12A–FIG. 12D show successive stages of cartridge engagement and retraction operations. It will be appreciated that successive stages of a cartridge engagement are described in the sequence of FIG. 12A–FIG. 12D, while conversely successive stages of a cartridge retraction operation are described in a reverse sequence (e.g., FIG. 12D–FIG. 12A). In FIG. 12A–FIG. 12D, as in other staged drawings for this embodiment, the data cartridge 72 is shown in cross section for sake of showing the location of reel lock notch 160.

Figure 12A:
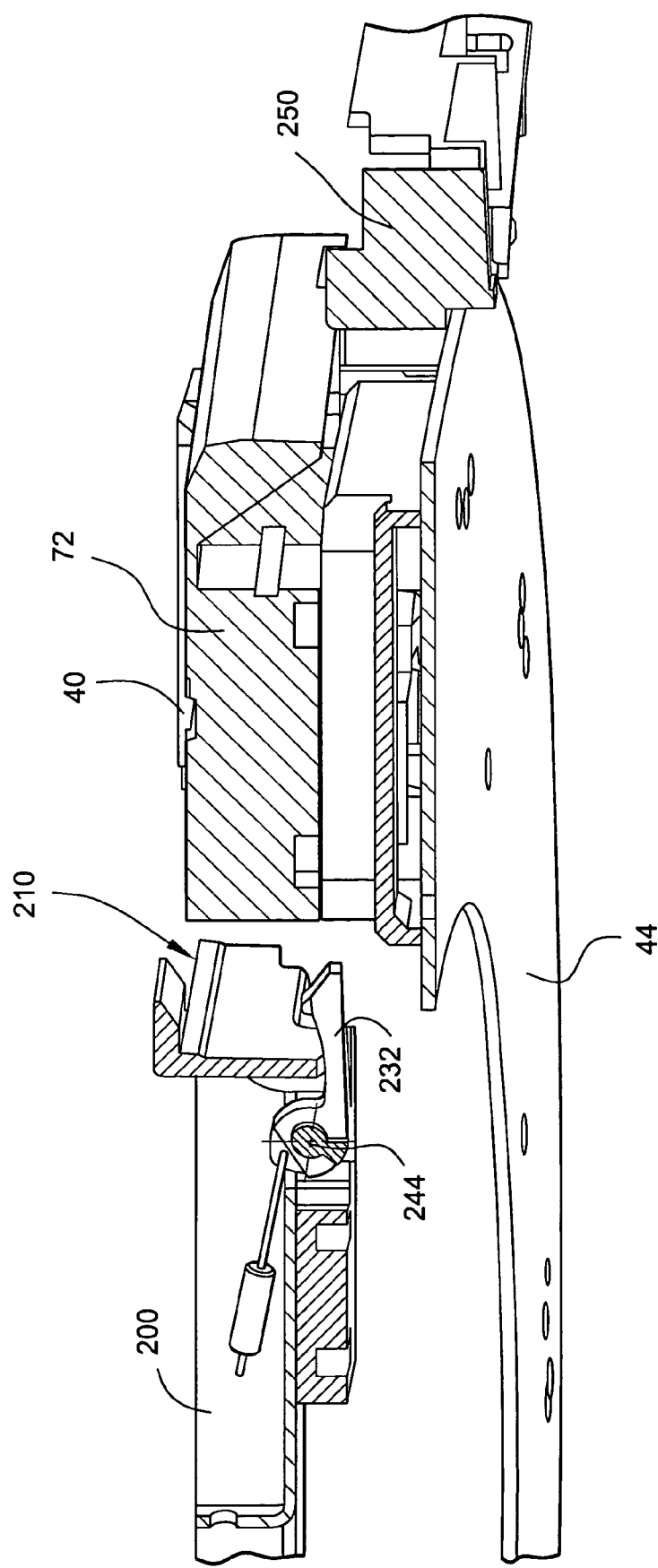
FIG. 12A–FIG. 12D are perspective views from beneath and aside portions of the data cartridge handling apparatus of FIG. 8 in successive stages of a cartridge retraction operation or (in reverse sequence) a cartridge retraction operation.

Describing the cartridge engagement operation, in FIG. 12A the picker 200 is at its farthest extent of travel from forward knockoff cam 250. The data cartridge 72 is situated in its nominal storage position in the selected cell 52S of carousel 40. No part of gripper 210 yet contacts the data cartridge 72. In each of the stages depicted by FIG. 12B–FIG. 12E the picker 200 with its gripper 210 is moved slightly but progressively closer to forward knockoff cam 250.

Figure 12B:
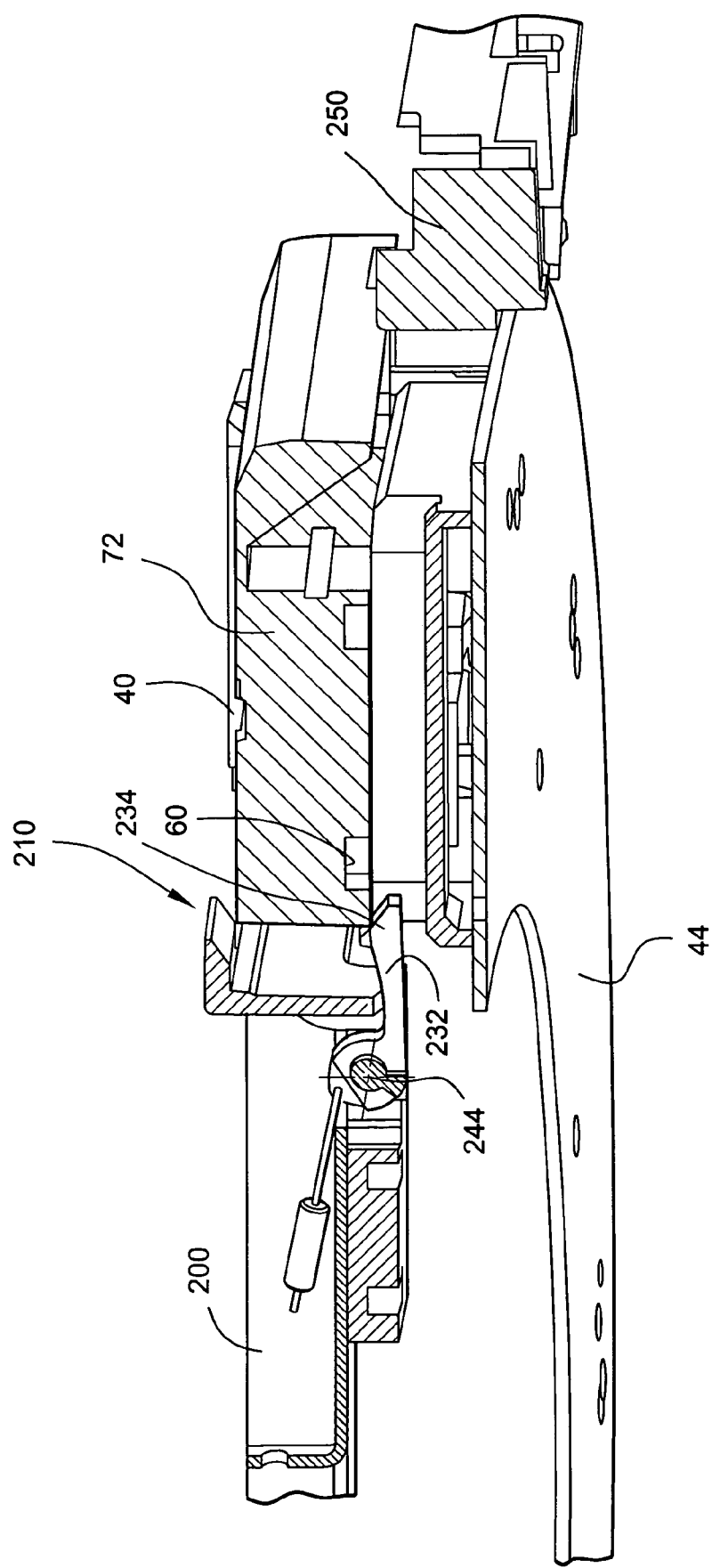

In FIG. 12B, as picker 200 travels closer to forward knockoff cam 250 the thumb projection 234 of gripper 210 begins rides along the bottom of data cartridge 72. In this stage the force exerted by the linear translation of picker 200 causes thumb projection 234 to overcome the biasing force provided by biasing spring 246 and accordingly to go under the bottom of data cartridge 72.

Figure 12C:
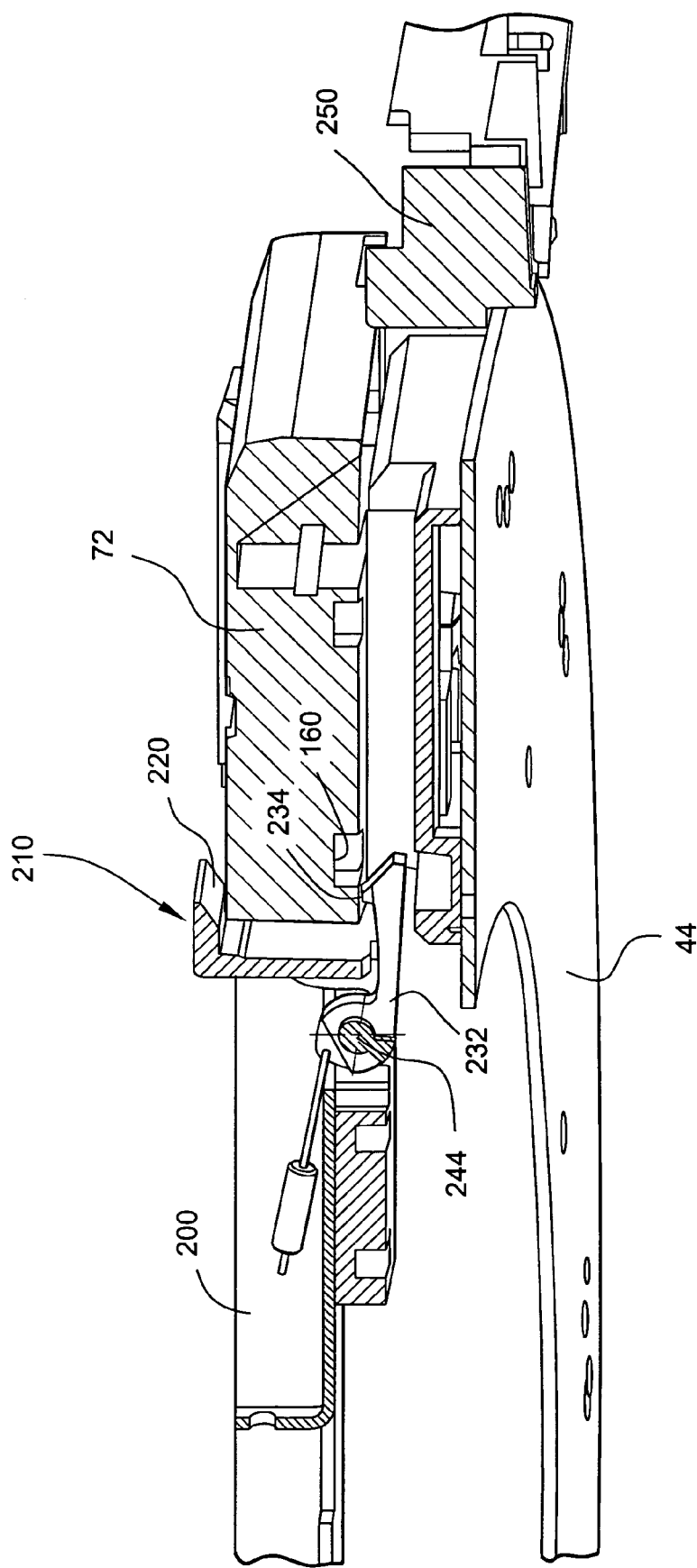

FIG. 12C shows the thumb projection 234 of gripper 210 having traveled further along the bottom of data cartridge 72, and the crown 220 just staring to ride over the top surface of data cartridge 72.

Figure 12D:
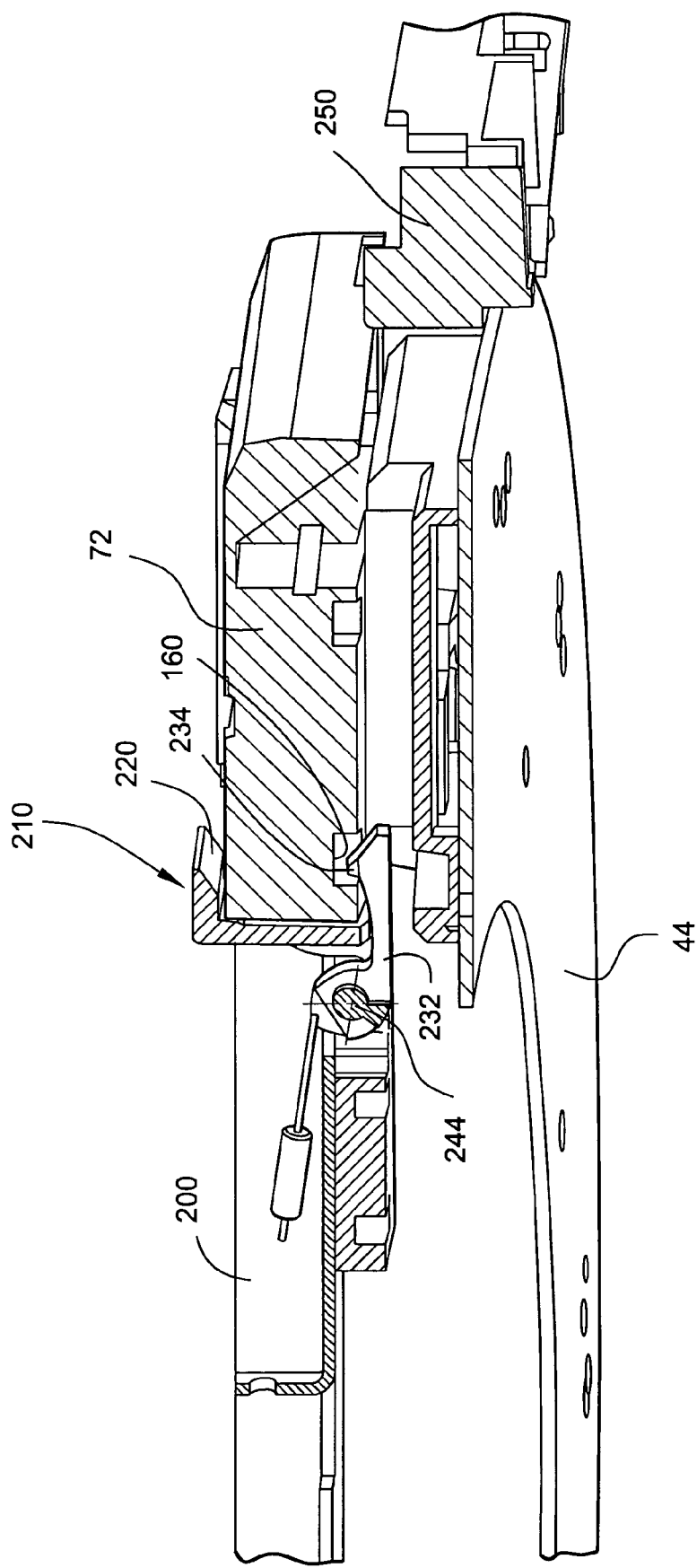

At the time of FIG. 12D, the picker 200 has traveled sufficiently further toward forward knockoff cam 250 so that the thumb projection 234 of pawl thumb 232 has entered reel lock notch 160 on the underside of data cartridge 72. In addition, the front surface of data cartridge 72 is now essentially flush with blade 218 of gripper 210. The crown 220 of gripper 210 extends over the top surface of data cartridge 72. The biasing force exerted by biasing spring 246 retains the data cartridge 72 between crown 220 and thumb projection 234 (the thumb projection 234 being inserted in reel lock notch 160).

Figure 13A:
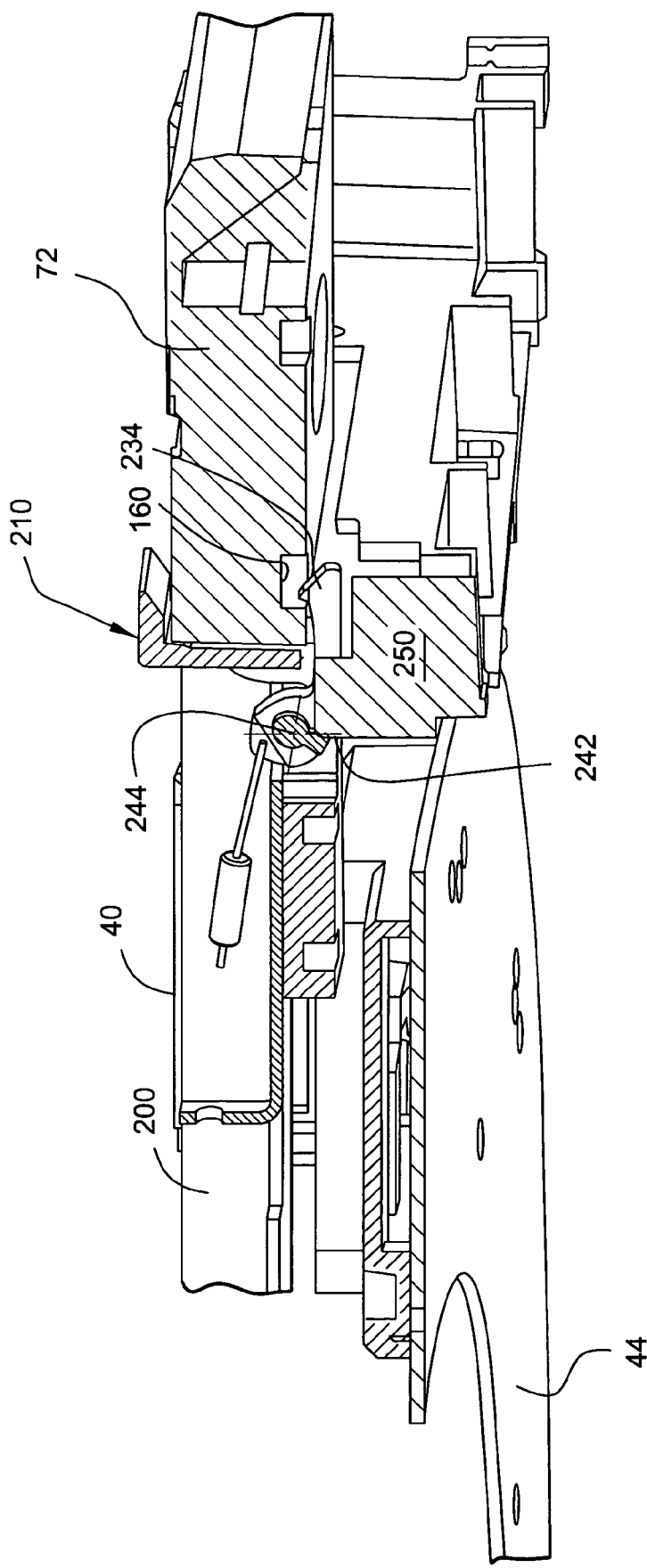
FIG. 13A–FIG. 13C are perspective views from beneath and aside portions of the data cartridge handling apparatus of FIG. 8 in successive stages of a cartridge loading operation.

Once engaged by performance of operations such as those described above with reference to FIG. 12A–FIG. 12E, the picker 200 with its engaged data cartridge 72 is linearly displaced in the direction of arrow 106 toward forward knockoff cam 250 and tape drive 70. In so moving, the data cartridge 72 is carried out of the selected cell 52S in carousel 40 and toward the tape drive 70. As the gripper 110 carrying the data cartridge 72 approaches tape drive 70, eventually (after the data cartridge 72 begins to enter tape drive 70) the forward knockoff follower 242 which depends from pawl assembly 230 strikes the forward knockoff cam 250 as shown in FIG. 13A. At this point the thumb projection 234 begins to retract or withdraw from reel lock notch 160 on the underside of data cartridge 72. In addition, the data cartridge 72 is now supported by a unillustrated drive loader tray. This begins the final stages of a cartridge loading operation depicted in FIG. 13A–FIG. 13C.

Figure 13B:
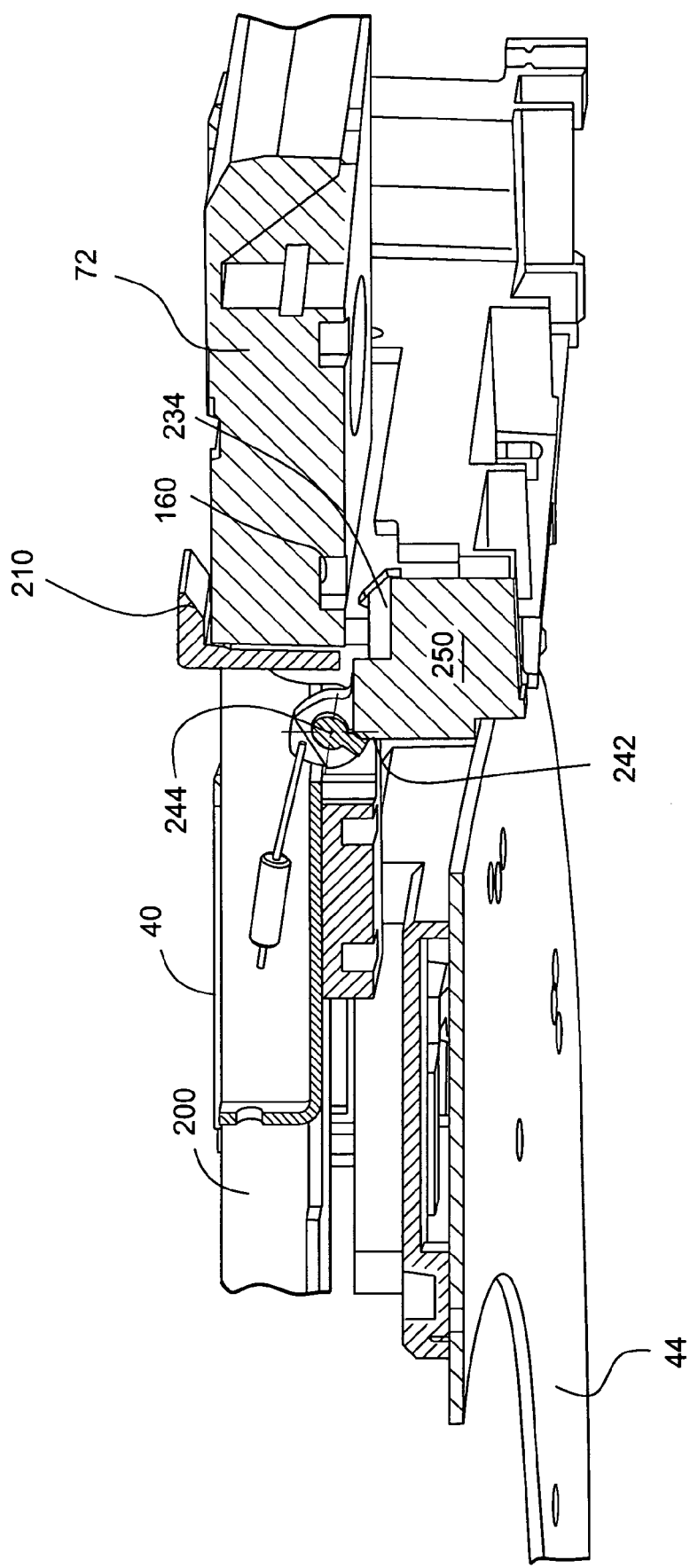

As gripper 210 moves even closer toward forward knockoff cam 250 and tape drive 70, the pawl assembly 230 rotates further in a clockwise direction (as seen in FIG. 13B) about axis 244. That is, as picker 200 approaches more closely tape drive 70, the forward knockoff cam 250 causes forward knockoff follower 242 to rotate further about axis 244. As a result, thumb projection 234 further recedes from reel lock notch 160.

Figure 13C:
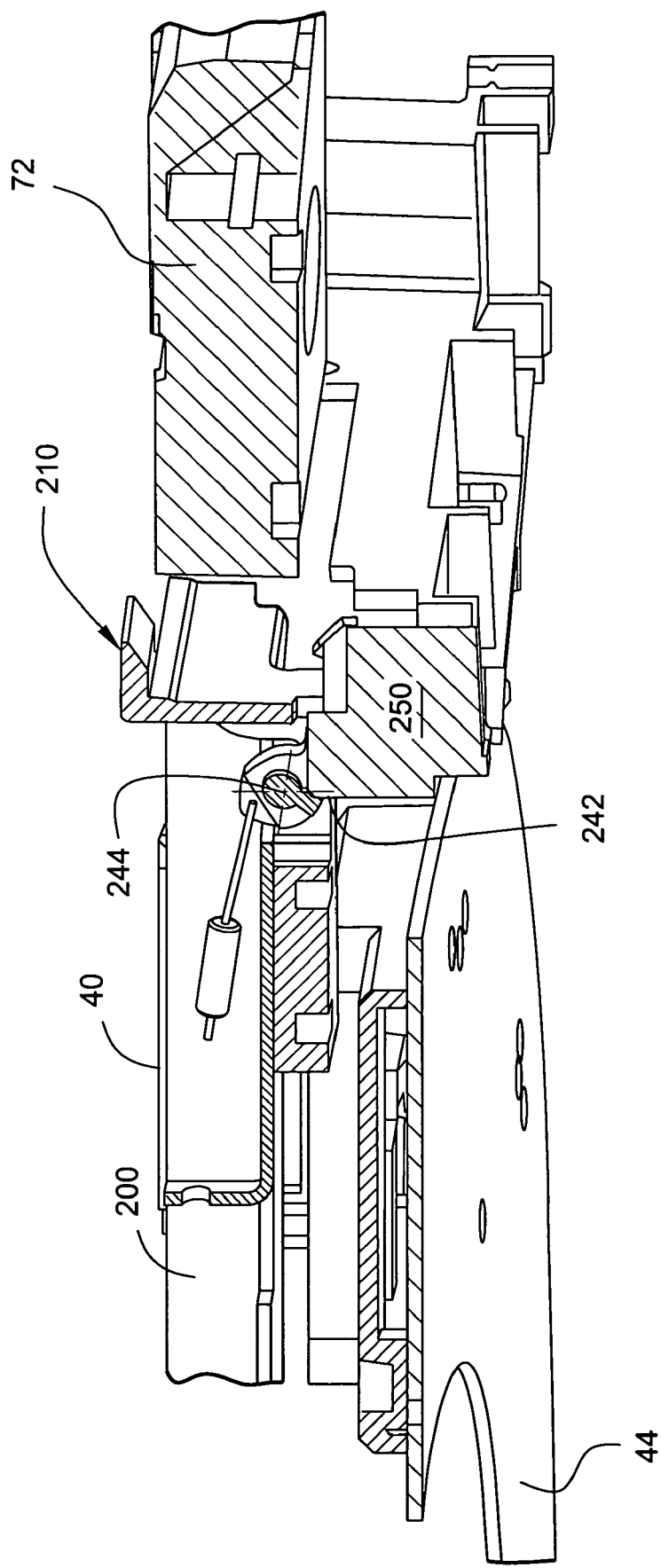

FIG. 13C shows the picker 200 withdrawing from tape drive 70 after the data cartridge 72 has been engaged by or loaded into tape drive 70. The blade 218 of gripper 210 has thus backed away from the tape drive 70, but at the time shown in FIG. 13C the forward knockoff follower 242 of pawl assembly 230 is still in contact with forward knockoff cam 250. As the picker 200 continues its rearward travel in a direction opposite the direction of arrow 106, the forward knockoff follower 242 is released from contact with forward knockoff cam 250. Upon such release, the biasing force exerted by biasing spring 246 causes pawl assembly 230 to pivot about axis 244 so that pawl thumb 232 assumes its biased horizontal position. The axle midsections 240 can continue to travel rearwardly to a home position such as shown in FIG. 12A or FIG. 14I.

Figure 14A:
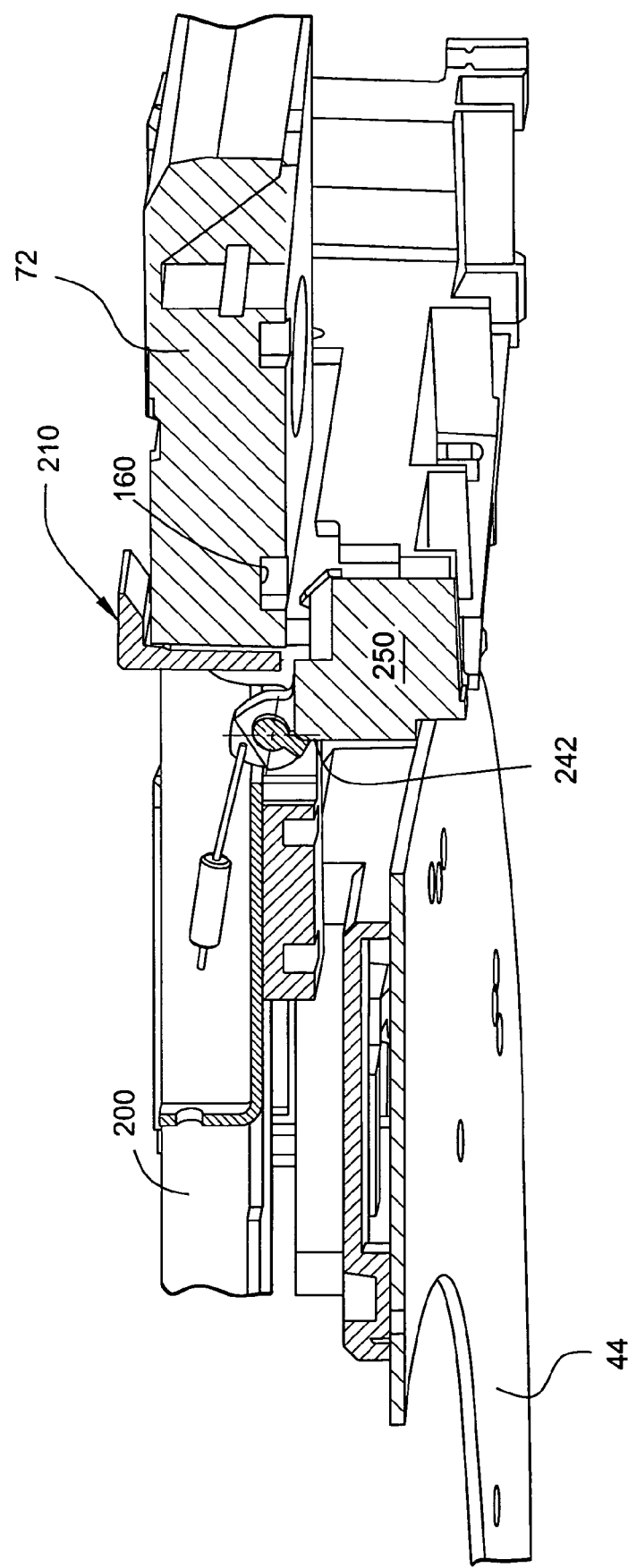
Figure 14B:
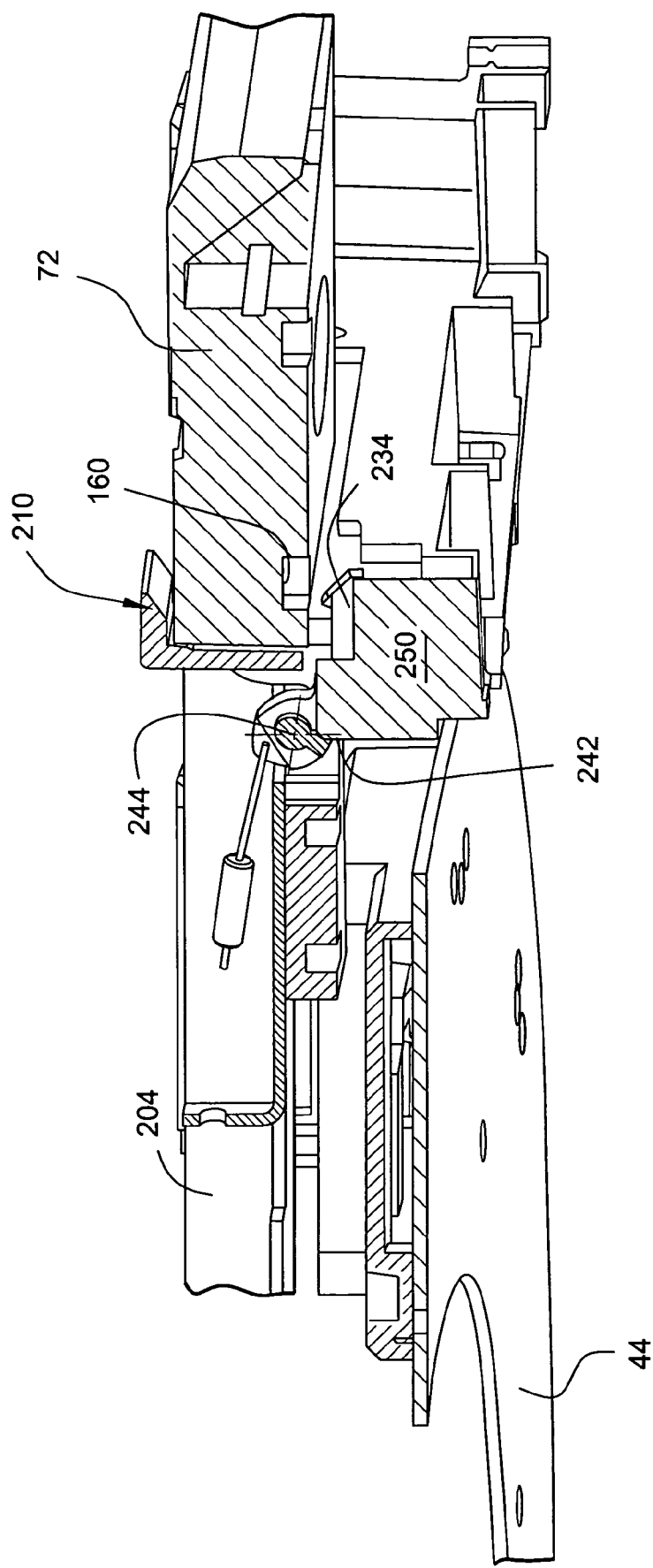
Figure 14D:
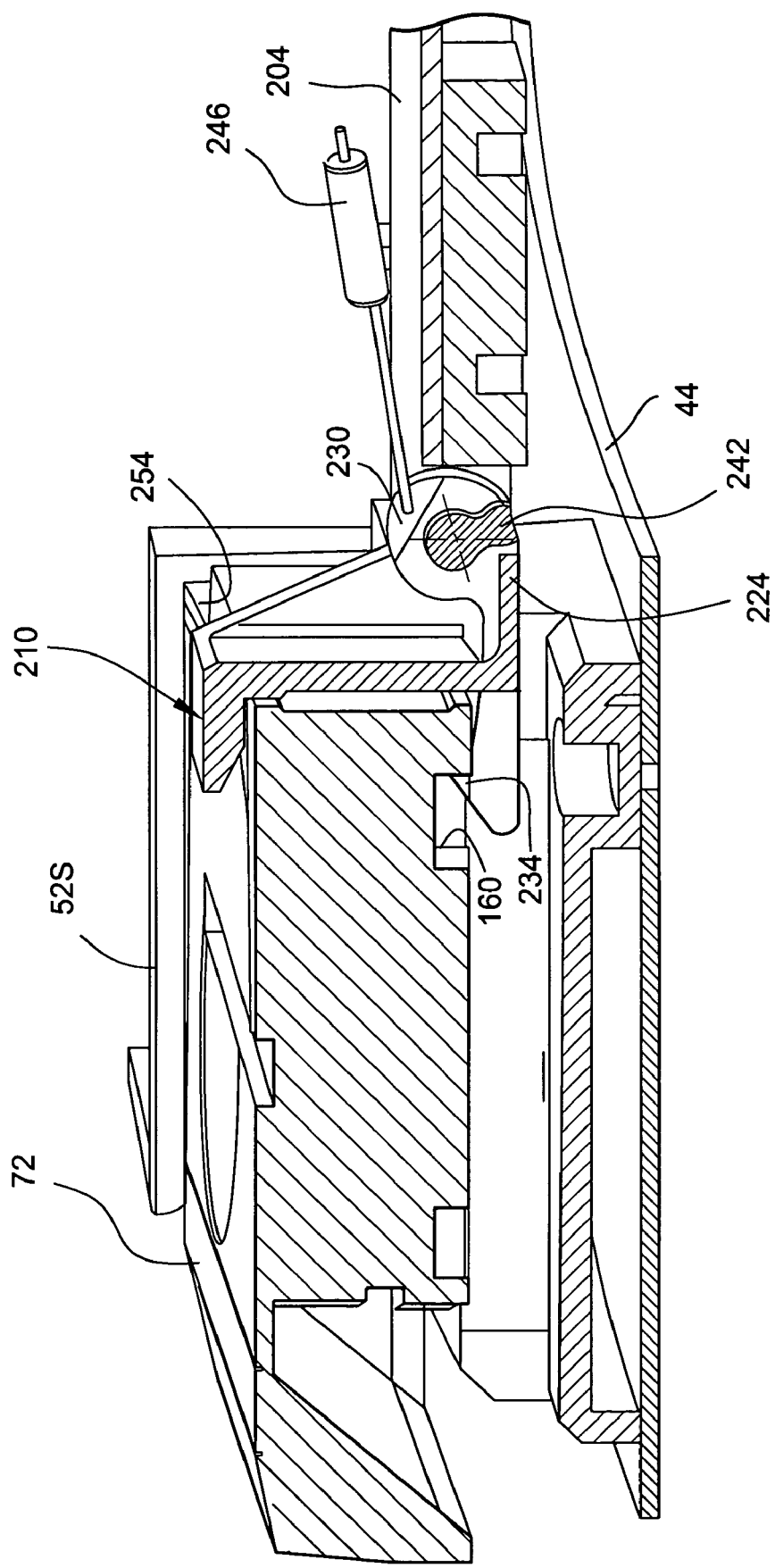
FIG. 14D–FIG. 14I are perspective views from beneath and aside portions of the data cartridge handling apparatus of FIG. 8 in successive stages of a cartridge fetching operation.
Figure 14E:
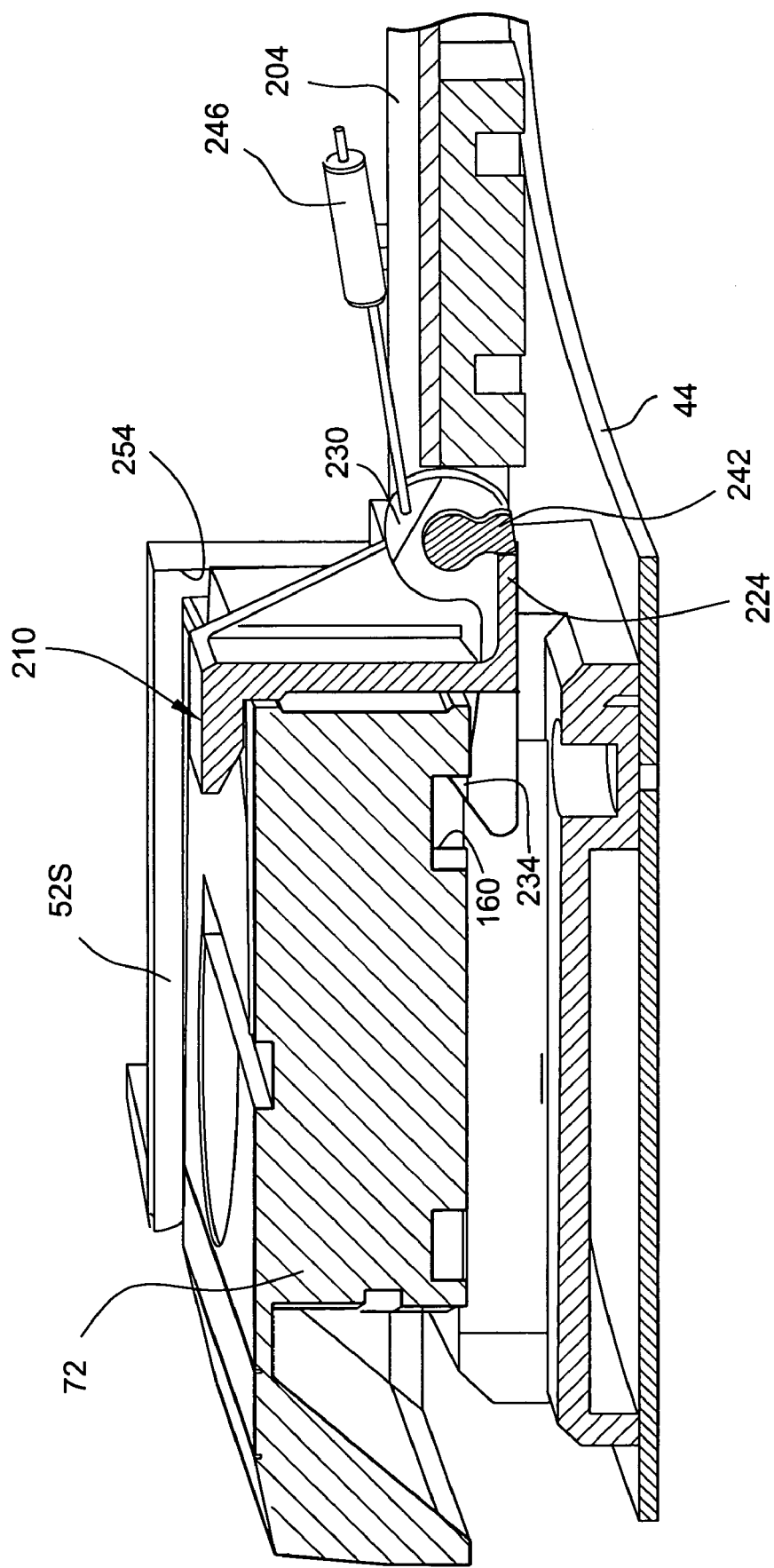
Figure 14F:
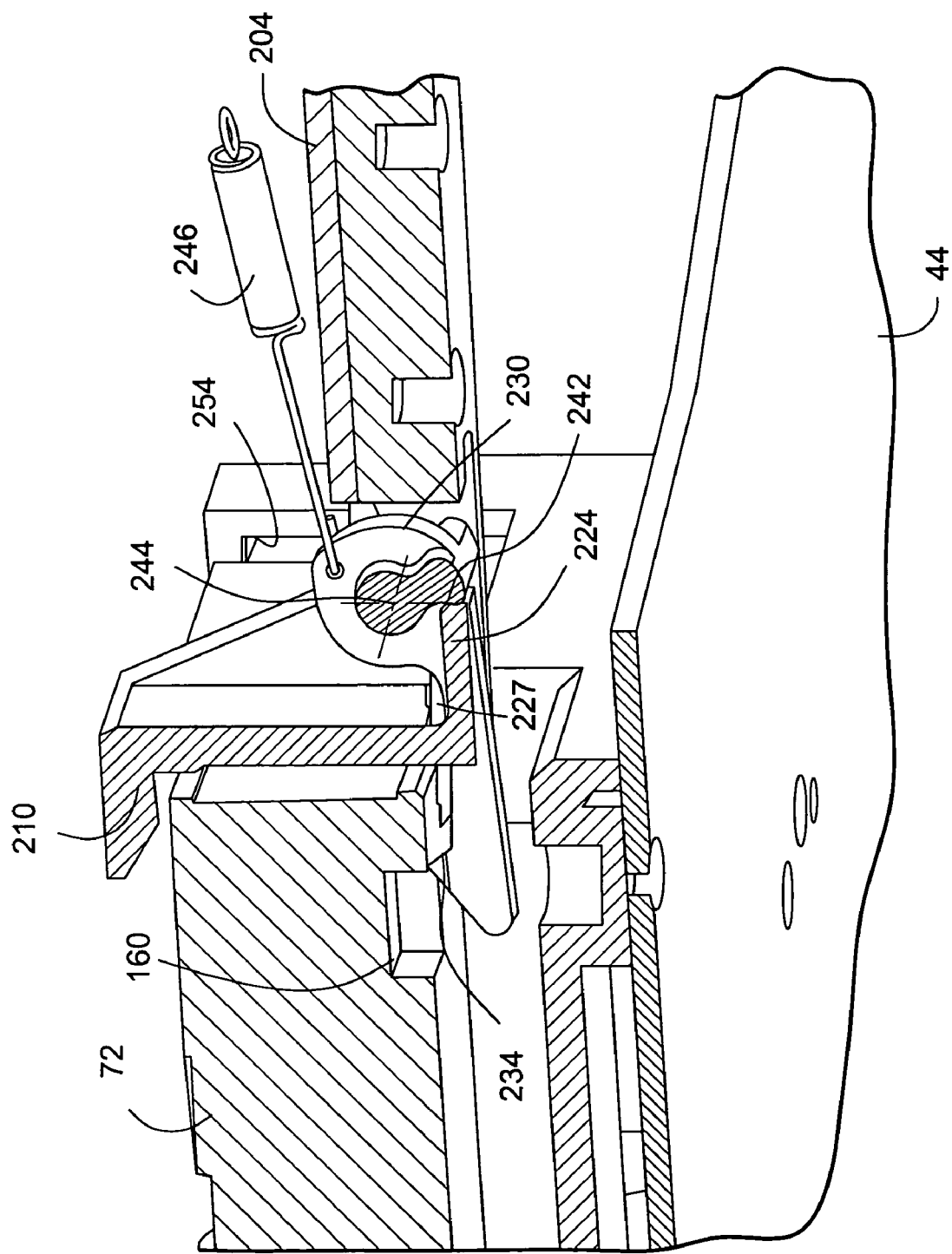
Figure 14G:
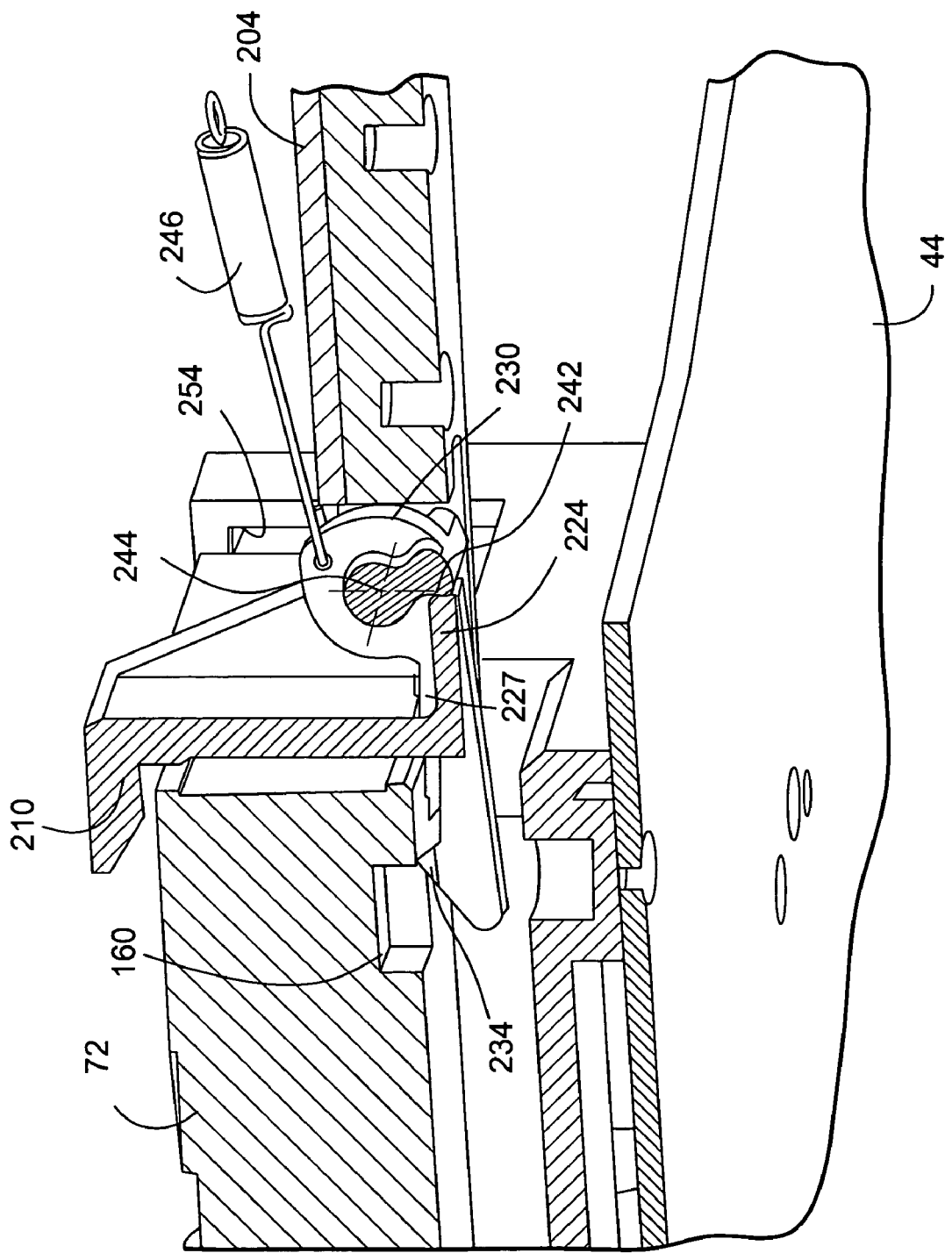
Figure 14H:
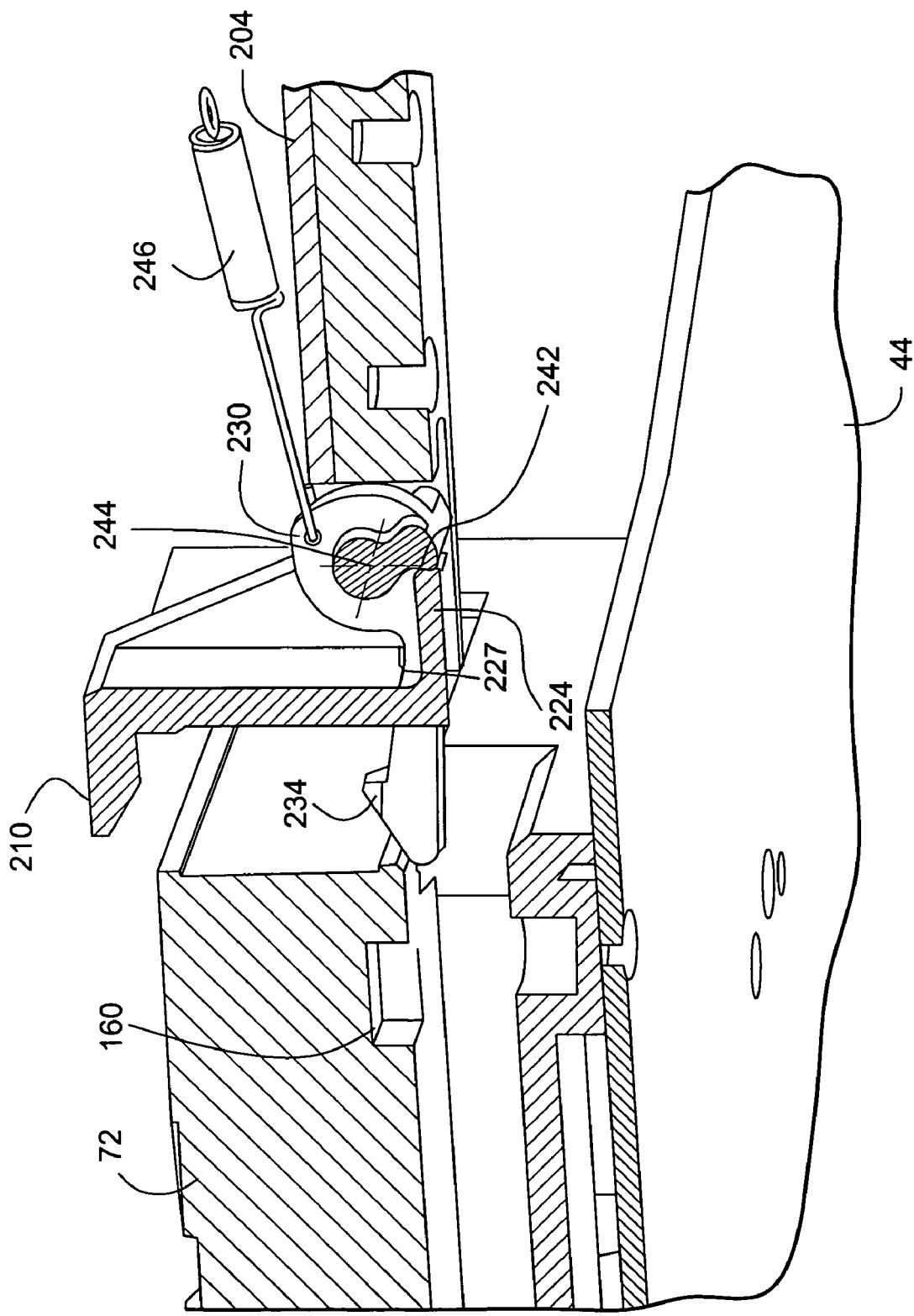
Figure 14I:
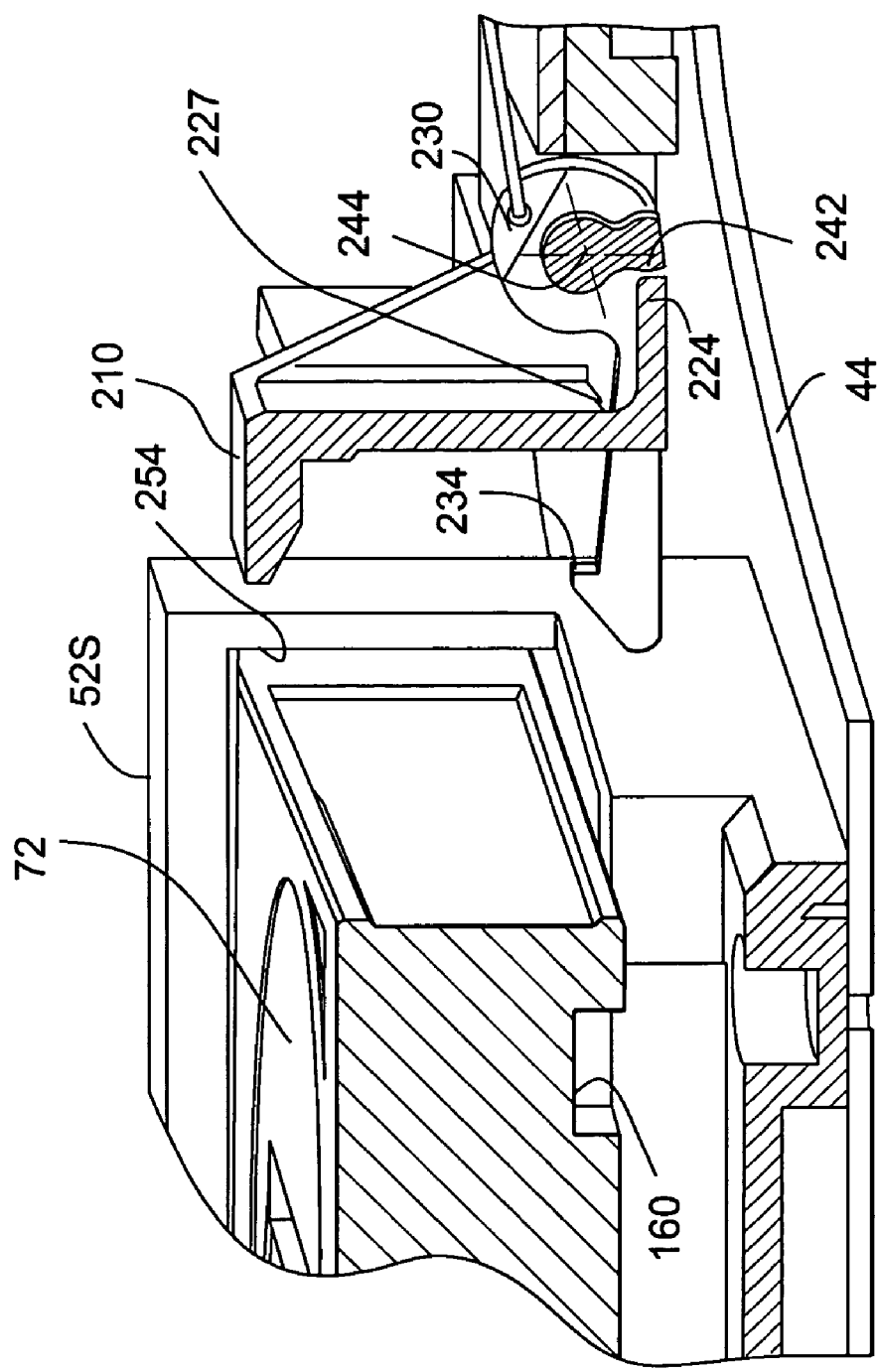

FIG. 14A–FIG. 14B, FIG. 14C(1)–FIG. 14C(2), and FIG. 14D–FIG. 14I show basic stages of a cartridge fetch operation. Prior to the beginning of the cartridge fetch operation, picker 200 with its gripper 210 had been withdrawn from the immediate vicinity of tape drive 70. At the beginning of the cartridge fetch operation, the data cartridge 72 has just been discharged from tape drive 70 as shown in FIG. 14A. Moreover, the picker 200 has been linearly translated back toward tape drive 70, with blade 218 proximate or even abutting the front surface of data cartridge 72.

FIG. 14B shows gripper 210 retracting away from forward knockoff cam 250. As gripper 210 retracts, the pawl assembly 230 is again free to rotate counterclockwise (as seen in FIG. 14B) about axis 244 because of the force exerted by biasing spring 246. This rotation permits thumb projection 234 to return to (e.g., re-engage) reel lock notch 160 on the underside of data cartridge 72. The data cartridge 72 is therefore engaged between thumb projection 234 and crown 220 of gripper 210 during this stage.

FIG. 14C(1) illustrates, from a right side view of picker 200, a further stage in which gripper 210 has retracted further, thereby enabling thumb projection 234 (engaging reel lock notch 160) to pull the data cartridge 72 partially into selected cell 52S. FIG. 14C(2) illustrates the same stage as FIG. 14C(1), but from a left side and rear view of picker 200 and is sectioned along a force sensitive knock off cam 224 and its corresponding force sensitive knockoff follower 243. At this point in time the biasing force applied by biasing spring 246 keeps axle 236 of pawl assembly 230 toward the rear of the grooves 228 (the "first position" in grooves 228). As such, the force sensitive knockoff follower 243 is not yet in contact with force sensitive knock off cam 224.

FIG. 14D shows that picker 200 with its picker arm 204 has retracted slight further to a point where the data cartridge 72 has just made contact with a backstop 254 in selected cell 52S. The data cartridge 72 is stalled by backstop 254 in selected cell 52S. However, as the picker 200 continues to move rearwardly, the pawl assembly 230 (whose thumb projection 234 is still engaged in reel lock notch 160 of the data cartridge 72) experiences a force from the now-stationary data cartridge 72. This cartridge-caused force overcomes the biasing force applied by biasing spring 246, thereby causing the axle 236 to move forwardly in grooves 228 to a "second position" (e.g., move toward data cartridge 72). In so moving, the force sensitive knockoff follower 243 of pawl assembly 230 contacts force sensitive knock off cam 224 provided on pawl tray 211 as shown in FIG. 14E.

As picker 200 continues to retract, the pawl assembly 230 continues to extend further, so that the force sensitive knock off cam 224 causes the force sensitive knockoff follower 243 to rotate about axis 244 as shown in FIG. 14F. The rotation of pawl assembly 230 causes thumb projection 234 to disengage from reel lock notch 160 (see FIG. 14F).

With the thumb projection 234 of pawl assembly 230 disengaged from reel lock notch 160, the data cartridge 72 no longer applies a force to pawl assembly 230. In the absence of the cartridge-applied force, the biasing spring 246 pulls the pawl assembly 230 back in grooves 228 as shown in FIG. 14G. The thumb projection 234 rides along the underside surface of data cartridge 72. As the picker 200 continues to retract from data cartridge 72, the ramped surface of thumb projection 234 gradually becomes free of the edge of data cartridge 72, thereby allowing the pawl assembly 230 to return to its nominal position against pawl upstop 227 (see FIG. 14H). FIG. 14I shows picker 200 at its home position with pawl assembly 230 against the pawl upstop 227.

Thus, the pawl assembly 230 has a forward knockoff follower 242 which works with forward knockoff cam 250 and a force sensitive knockoff follower 243 which works with force sensitive knock off cam 224. The forward knockoff follower 242 and force sensitive knockoff follower 243 are close to the center of rotation (axis 244) of pawl assembly 230. Due to this close proximity, the thumb projection 234 of pawl assembly 230 can be rotated (e.g., down or clockwise in the sense of FIG. 9) with less forward motion of picker 200. This allows picker 200 to directly insert the data cartridge 72 into tape drive 70. In this way the picker 200 only needs to generate a force comparable to that of the cartridge loader of the tape drive 70.

Problems arise should the forward knockoff follower 242 be located at a point further from the center of rotation of pawl assembly 230. A first problem is that the forward stroke of the picker 200 is limited because the rotation of pawl assembly 230 per unit of forward travel of picker 200 is reduced. The reduced rotation allows the pawl assembly 230 to interference with the tape drive 70 before the cartridge insertion is complete. This limited travel of picker 200 requires the rotation of pawl assembly 230 to provide the additional motion required to complete the insertion of the data cartridge 72. The surface added to pawl assembly 230 to provide the additional cartridge motion is at a larger radius than the hook trip feature. This causes the force required by the picker to increase by the ratio of the cartridge loading surface radius divided by the hook trip feature radius.

The technique of removing the thumb projection 234 from reel lock notch 160 of data cartridge 72 at the point where the data cartridge 72 hits the backstop 254 of the selected cell 52S is also valuable. In the second embodiment, the pawl assembly 230 is allowed to translate forward relative to the picker 200 when the motion of data cartridge 72 is stopped by the backstop 254. This translation of the pawl assembly 230 relative to picker 200 allows force sensitive knockoff follower 243 of pawl assembly 230 to rotate the thumb projection 234 out of engagement with reel lock notch 160 of data cartridge 72. This force sensitive release of thumb projection 234 from reel lock notch 160 avoids the mechanical tolerance issues of making the location of a physical hook trip coincide with the cartridge motion being stopped by the rear wall of the cartridge cell.

Advantageously, the picker 200 of the second embodiment utilizes a non-automation feature of data cartridge 72 for engagement, e.g., reel lock notch 160.

The pawl assembly 230 is essentially totally passive. Whereas typical prior art grippers utilize motors, solenoids, and the like, the pawl assembly 230 uses a spring, cams and cam followers without carrying or directly operated by electronic or motorized actuators. The passive mechanical nature of pawl assembly 230 reduces cost and enhances reliability.

Typical prior art cartridge grippers are not very compliant, and must be precisely aligned relative to a cartridge cell and a tape drive. By virtue of the picker 200, the data cartridge 72 can move both vertically and horizontally with respect to pawl assembly 230, thereby allowing control surfaces to guide the data cartridge 72 between selected cell 52S and tape drive 70.

The force sensitive knock off cam 224 working with force sensitive knockoff follower 243 effectively pulls the thumb projection 234 out of the reel lock notch 160 of data cartridge 72 when the data cartridge 72 hits the cell backstop 254. This manner of retracting the thumb projection 234 eliminates several prior art problems. For example, a prior art fixed interposer to pull the pawl hook from the data cartridge hole requires tight tolerance control of the fixed interposer with respect to the cell backstop and the pawl. Moreover, with a prior art type fixed interposer, if the data cartridge hits a cell backstop before the pawl hits the fixed interposer, a high force is generated between the data cartridge and the pawl hook, causing wear and picker control problems. Yet further, with a fixed interposer, if a pawl or the like hits the fixed interposer before the cartridge hits the cell backstop, the data cartridge is not properly seated in the cell.

While the foregoing has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data cartridge handling apparatus comprising:

a housing;

a ring-shaped carousel rotatably mounted within the housing, between an inner periphery and an outer periphery the carousel having a plurality of cartridge-accommodating cells angularly arranged therearound;

a transducing drive mounted within the housing outside the outer periphery;

a motor which rotates the carousel to facilitate selective alignment of a cell and the drive along a radial dimension of the carousel;

a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;

the gripper comprising a thumb, at least one of the gripper and the thumb being pivotally connected to the picker arm to allow selective engagement and disengagement of the thumb with a feature on a data cartridge;

a trip member mounted in the housing between the outer periphery and the drive for actuating pivoting of the gripper and thereby the selective disengagement;

wherein the feature is reel lock notch formed on an underside of the data cartridge, and wherein the thumb has a projection formed thereon which extends into the reel lock notch during the selective engagement.

2. The apparatus of claim 1, wherein the feature is a reel lock notch formed on an underside of a data cartridge which accommodates 8 millimiter magnetic tape.

3. The apparatus of claim 1, wherein the projection has an essentially right triangular shape with a truncated apex angle formed as a notch engagement surface.

4. A data cartridge handling apparatus comprising:
a housing;
a ring-shaped carousel rotatably mounted within the housing, between an inner periphery and an outer periphery the carousel having a plurality of cartridge-accommodating cells angularly arranged therearound;
a transducing drive mounted within the housing outside the outer periphery;
a motor which rotates the carousel to facilitate selective alignment of a cell and the drive along a radial dimension of the carousel;
a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
the gripper comprising a thumb, one of the gripper and the thumb being pivotally connected to the picker arm to allow selective engagement and disengagement of the thumb with a feature on a data cartridge;
a trip member mounted in the housing between the outer periphery and the drive for actuating pivoting of the gripper and thereby the selective disengagement;
wherein the gripper has a spur which contacts the trip member during pivoting actuation of the gripper.

5. A data cartridge handling apparatus comprising:
a housing;
a ring-shaped carousel rotatably mounted within the housing, between an inner periphery and an outer periphery the carousel having a plurality of cartridge-accommodating cells angularly arranged therearound;
a transducing drive mounted within the housing outside the outer periphery;
a motor which rotates the carousel to facilitate selective alignment of a cell and the drive along a radial dimension of the carousel;
a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
the gripper comprising a thumb, at least one of the gripper and the thumb being pivotally connected to the picker arm to allow selective engagement and disengagement of the thumb with a feature on a data cartridge;
a trip member mounted in the housing between the outer periphery and the drive for actuating pivoting of the gripper and thereby the selective disengagement;
wherein along an axis of the carousel the housing has a height of 1.75 inches.

6. A data cartridge handling apparatus comprising:
a housing;
a ring-shaped carousel rotatably mounted within the housing, between an inner periphery and an outer periphery the carousel having a plurality of cartridge-accommodating cells angularly arranged therearound;
a transducing drive mounted within the housing outside the outer periphery;
a motor which rotates the carousel to facilitate selective alignment of a cell and the drive along a radial dimension of the carousel;
a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
the gripper comprising a thumb, at least one of the gripper and the thumb being pivotally connected to the picker arm to allow selective engagement and disengagement of the thumb with a feature on a data cartridge;
a trip member mounted in the housing between the outer periphery and the drive for actuating pivoting of the gripper and thereby the selective disengagement;
wherein the carousel has a diameter of approximately seventeen inches.

7. A data cartridge handling apparatus comprising:
a housing;
a ring-shaped carousel rotatably mounted within the housing, between an inner periphery and an outer periphery the carousel having a plurality of cartridge-accommodating cells angularly arranged therearound;
a transducing drive mounted within the housing outside the outer periphery;
a motor which rotates the carousel to facilitate selective alignment of a cell and the drive along a radial dimension of the carousel;
a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
the gripper comprising a thumb, at least one of the gripper and the thumb being pivotally connected to the picker arm to allow selective engagement and disengagement of the thumb with a feature on a data cartridge;
a trip member mounted in the housing between the outer periphery and the drive for actuating pivioting or the gripper and thereby the selective disengagement;
wherein the housing is sized to fit into a standard seventeen inch equipment rack.

8. The apparatus of claim 7, further comprising biasing means for biasing the gripper relative to the picker arm.

9. The apparatus of claim 7, wherein the carousel comprises ten cells.

10. The apparatus of claim 7, wherein along an axis of rotation of the carousel the housing has a height substantially equal to a height of the drive. the thumb with a feature on a data cartridge;
- a trip member mounted in the housing between the outer periphery and the drive for actuating pivoting of the gripper and thereby the selective disengagement.
- wherein the housing is sized to fit into a standard seventeen inch equipment rack.

11. A data cartridge handling apparatus comprising:
- a housing;
- a ring-shaped carousel rotatably mounted within the housing, between an inner periphery and an outer periphery the carousel having a plurality of cartridge-accommodating cells angularly arranged therearound;
- a transducing drive mounted within the housing outside the outer periphery;
- a motor which rotates the carousel to facilitate selective alignment of a cell and the drive along a radial dimension of the carousel;
- a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
- the gripper comprising a thumb, at least one of the gripper and the thumb being pivotally connected to the picker arm to allow selective engagement and disengagement of the thumb with a feature on a data cartridge;
- a trip member mounted in the housing between the outer periphery and the drive for actuating pivoting of the gripper and thereby the selective disengagement;
- wherein the gripper further comprises a finger which has a curved cartridge loading surface adapted to contact and urge the data cartridge into the drive;
- wherein the a first surface of the finger and a first surface of the thumb are oriented substantially orthogonally to form an essentially L-configured cartridge contacting profile, and wherein a pivot axis of the gripper is situated proximate an intersection of first surface of the finger and the first surface of the thumb.

12. A data cartridge handling apparatus comprising:
- a housing;
- a ring-shaped carousel rotatably mounted within the housing, between an inner periphery and an outer periphery the carousel having a plurality of cartridge-accommodating cells angularly arranged therearound;
- a transducing drive mounted within the housing outside the outer periphery;
- a motor which rotates the carousel to facilitate selective alignment of a cell and the drive along a radial dimension of the carousel;
- a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
- the gripper comprising a thumb, least one of the gripper and the thumb being pivotally connected to the picker arm to allow selective engagement and disengagement of the thumb with a feature on a data cartridge;
- a trip member mounted in the housing between the outer periphery and the drive for actuating pivoting of the gripper and thereby the selective disengagement;
- wherein the gripper comprising a pawl assembly which is pivotally connected to the picker arm and which slides in the radial direction.

13. A data cartridge handling apparatus comprising:
- a housing;
- a ring-shaped carousel rotatably mounted within the housing, between an inner periphery and an outer periphery the carousel having a plurality of cartridge-accommodating cells angularly arranged therearound;
- a transducing drive mounted within the housing outside the outer periphery;
- a motor which rotates the carousel to facilitate selective alignment of a cell and the drive along a radial dimension of the carousel;
- a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
- the gripper comprising a thumb, at least one of the gripper and the thumb being pivotally connected to the picker arm to allow selective engagement and disengagement of the thumb with a feature on a data cartridge;
- a trip member mounted in the housing between the outer periphery and the drive for actuating pivoting of the gripper and thereby the selective disengagement;
- wherein the gripper comprises a pawl assembly which is pivotally connected to the picker arm, wherein the pawl assembly has an axle, and wherein the axle carries a follower which selectively contacts the trip member for actuating the pivoting of the gripper and thereby the selective disengagement.

14. A data cartridge handling apparatus comprising:
- a housing;
- a ring-shaped carousel rotatably mounted within the housing, between an inner periphery and an outer periphery the carousel having a plurality of cartridge-accommodating cells angularly arranged therearound;
- a transducing drive mounted within the housing outside the outer periphery;
- a motor which rotates the carousel to facilitate selective alignment of a cell and the drive along a radial dimension of the carousel;
- a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
- the gripper comprising a thumb, at least one of the gripper and the thumb being pivotally connected to the picker arm to allow selective engagement and disengagement of the thumb with a feature on a data cartridge;
- a trip member mounted in the housing between the outer periphery and the drive for actuating pivoting of the gripper and thereby the selective disengagement;
- wherein
- the gripper comprises a pawl assembly which is pivotally connected to the picker arm and which slides in the radial direction;
- the pawl assembly has an axle;

the axle carriers a follower;
the gripper has a cam formed thereon;
the gripper has a channel;
the gripper comprises biasing means which exerts a biasing force for urging the axle into a first position in the channel; and
wherein when the picker arm linearly translates while the thumb engages the data cartridge and while the data cartridge is held stationary, the biasing force is overcome whereby the axle slides in the radial direction in the channel.

15. The apparatus of claim 14, wherein when the axle reaches a second position in the channel the follower contacts the cam, and wherein linear translation of the picker arm while the follower contacts the cam causes the thumb to disengage the feature on the data cartridge.

16. A data cartridge handling apparatus comprising:
a housing;
a ring-shaped carousel rotatably mounted within the housing, between an inner periphery and an outer periphery the carousel having a plurality of cartridge-accommodating cells angularly arranged therearound;
a transducing drive mounted within the housing outside the outer periphery;
a motor which rotates the carousel to facilitate selective alignment of a cell and the drive along a radial dimension of the carousel;
a picker mounted within the housing at a point within the inner periphery of the carousel, the picker having a picker arm which linearly translates in the radial dimension; a distal end of the picker arm having a gripper which selectively engages and transports a data cartridge in the radial dimension between the drive and a cell aligned therewith;
the gripper comprising a thumb, at least one of the gripper and the thumb being pivotally connected to the picker arm to allow selective engagement and disengagement of the thumb with a feature on a data cartridge;
a trip member mounted in the housing between the outer periphery and the drive for actuating pivoting of the gripper and thereby the selective disengagement;
wherein the gripper comprises a pawl assembly, wherein the pawl assembly has an axel, and wherein the axel carries a first follower and a second follower;
wherein the first follower selectively contacts the trip member for actuating the pivoting of the gripper and thereby the selective disengagement;
wherein the gripper has a cam formed thereon;
wherein the gripper has a channel;
wherein the gripper comprises biasing means which exerts a biasing force for urging the axle into a first position in the channel;
wherein when the picker arm linearly translates while the thumb engages the data cartridge and while the data cartridge is held stationary, the biasing force is overcome whereby the axle slides in the radial direction in the channel.

17. The apparatus of claim 16, wherein when the axle reaches a second position in the channel the second follower contacts the cam, and wherein linear translation of the picker arm while the second follower contacts the cam causes the thumb to disengage the feature on the data cartridge.

18. The apparatus of claim 16, wherein the first follower and the second follower are situated on opposite sides of a pawl thumb.

19. A method of operating a data cartridge handling apparatus comprising:
rotating a ring-shaped carousel within a housing whereby a selected one of a plurality of cartridge-accommodating cells angularly arranged therearound between an inner periphery and an outer periphery the carousel becomes aligned with a transducing drive along a radial dimension of the carousel, the drive being situated within the housing and outside the outer periphery;
selectively engaging a feature of a data cartridge residing in a cell aligned with the drive by pivoting one of the gripper and a thumb comprising the gripper to facilitate engagement of the feature, the gripper and the thumb being carried by a picker arm which is mounted within the housing at a point within the inner periphery of the carousel;
linearly translating the picker arm and the data cartridge engaged thereby in the radial dimension;
using a trip member mounted in the housing between the outer periphery and the drive to actuate rotation of the gripper and thereby release of the data cartridge during loading of the data cartridge into the drive;
wherein the feature is a reel lock notch formed on an underside of the data cartridge, and
wherein the step of selectively engaging comprises extending a projection formed on the thumb into the reel lock notch during the selective engagement.

20. The method of claim 19, further comprising contacting the trip member with a spur on the gripper during pivoting actuation of the gripper.

21. The method of claim 19, further comprising biasing the gripper relative to the picker arm.

22. The method of claim 21, wherein the gripper comprises a pawl assembly which is pivotally connected to the picker arm and which slides in the radial direction; wherein the pawl assembly has an axle; wherein the gripper has a channel; and wherein the method further comprises:
wherein when the picker arm linearly translates while the thumb engages the data cartridge and while the data cartridge is held stationary, allowing the axle to slide in the radial direction in the channel.

23. The apparatus of claim 22, further comprising, when the axle reaches a predetermined position in the channel, linearly translating the picker arm while a follower contacts a cam on the axle thereby causing the thumb to rotate and disengage the feature on the data cartridge.

* * * * *